United States Patent
Cole et al.

(10) Patent No.: US 7,468,515 B2
(45) Date of Patent: Dec. 23, 2008

(54) ULTRA VIOLET LIGHT SENSOR

(75) Inventors: Barrett E. Cole, Bloomington, MN (US); Robert E. Higashi, Shorewood, MN (US); James Bartels, Hudson, WI (US); Norm Planer, Annandale, MN (US); Gregg Swanson, Long Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 266 days.

(21) Appl. No.: 11/164,946

(22) Filed: Dec. 12, 2005

(65) Prior Publication Data
US 2007/0131869 A1  Jun. 14, 2007

(51) Int. Cl.
G01J 1/42 (2006.01)
(52) U.S. Cl. ....................................... 250/372
(58) Field of Classification Search ................ 250/372, 250/374; 313/539; 438/48, 51
See application file for complete search history.

(56) References Cited

U.S. PATENT DOCUMENTS

| | | | |
|---|---|---|---|
| 3,337,734 A * | 8/1967 | Chubb | 250/372 |
| 3,372,279 A | 3/1968 | Engh et al. | |
| 4,581,536 A | 4/1986 | Groppetti et al. | |
| 5,294,789 A * | 3/1994 | Kruger | 250/214.1 |
| 5,349,194 A | 9/1994 | Wuest et al. | |
| 5,504,386 A | 4/1996 | Kyushima et al. | |
| 5,959,301 A | 9/1999 | Warashina | |
| 6,121,621 A | 9/2000 | Warashina et al. | |
| 6,559,576 B1 | 5/2003 | Ikedo et al. | |
| 6,573,655 B1 | 6/2003 | Ikedo et al. | |
| RE38,234 E | 8/2003 | Warashina et al. | |
| 2002/0089283 A1 | 7/2002 | Francke et al. | |
| 2003/0012252 A1 | 1/2003 | Bender | |
| 2003/0178571 A1 | 9/2003 | Nayfeh et al. | |
| 2005/0127835 A1 | 6/2005 | Cole et al. | |
| 2005/0230767 A1 * | 10/2005 | Park et al. | 257/414 |

FOREIGN PATENT DOCUMENTS

WO  2006039444  4/2006

OTHER PUBLICATIONS

Nerguizian et al., "Intelligent sensors for UV detection", 2004 IEEE, International Conference on Industrial Technology, p. 991-995.*
Hamamatsu, "Electron Tube Products, Condensed Catalog," 19 pages, Aug. 2003.

* cited by examiner

*Primary Examiner*—David P Porta
*Assistant Examiner*—Kiho Kim
(74) *Attorney, Agent, or Firm*—Kris T. Fredrick

(57) ABSTRACT

A light detector having spaced electrodes preset by pins or a spacer within a sealed enclosure. The detector may have a MEMS structure that is separate from the sealing of the enclosure. Further, the detector may have a lens for the transmission of light onto the elements. The lens may be coated to affect the amount of light admitted into the enclosure. Light detectable by the sensor may be ultra-violet.

18 Claims, 31 Drawing Sheets

ULTRA VIOLET LIGHT SENSOR

BACKGROUND

The present invention relates to sensors and particularly to ultra violet light (UV) detectors. More particularly, the invention relates to well and economically packaged UV detectors.

The invention is related to U.S. patent application Ser. No. 10/957,376, filed Oct. 1, 2004, by Cole, and entitled "Small Gap Light Sensor"; and U.S. patent application Ser. No. 10/735,531, filed Dec. 12, 2003, by Cole et al., and entitled "Planar Ultra Violet Light Detector"; which are incorporated herein by reference.

SUMMARY

The invention is a low cost high reliability UV sensor having precisely placed electrodes, without sealing to the sensing structure, and an optional coating for reducing the level of radiation to the sensor.

DETAILED DESCRIPTION

Successful related art UV or flame detectors have been primarily based on highly specialized processes built around "vacuum" tube technology. The physics of such detectors are that the tube of each detector may have a cathode electrode such as tungsten or copper which is the surface from which optically excited electrons are originated, and an anode grid that lets light pass through it but is charged such that it will collect electrons generated by the breakdown instigated by the photoemission of an electron at the cathode surface. The tube may be filled with a neon/hydrogen ($Ne/H_2$) gas mixture to facilitate the breakdown nominally at about 100 Torr residual pressure. Several factors that appear to define and limit device yield and performance may include tube glass cleanliness, gas mixture, plate spacing and gas contamination. These potential causes of problems may be eliminated or minimized with the present invention.

The present invention may use cathode and anode materials that are the same as those in other UV tubes. Many related art tubes may have issues with scrap and long term reliability due to a need for manual operations of attaching parallel anode and cathode surfaces. Precise spacing of these plates in an Ne/H2 environment sealed to about 100 Torr vacuum integrity, with about 350 volts between the plates, may provide a sensor which when provided additional energy provide by a proximal UV source (e.g., flame) receives sufficient energy for a discharge event which is seen as a current/voltage on the output pins. A precise but low cost location of the electrode surfaces in a sealed gas environment may be provided by the present invention. The TO package design may be used for vertical alignment of the electrodes to further reduce costs.

The present sensor may leverage physical principles with advances in packaging. The sensor may use low cost vacuum sealed packages (e.g., TO5 or TO8) with UV transmissive windows. The sensor may use low cost ceramic, fused silica, glass and other substances of which precise thickness control (e.g., about 20 mils or 500 microns). Low cost approaches for attaching package pins to bond pads, foils or plated surfaces may be used. The elements for the sensor may be combined to provide a 500 micron geometry between the cathode and anode surfaces within a sealed gas environment improve performance of the UV (e.g., flame) sensor.

The UV detector may incorporate a MEMS structure in which the mini-UV tube or package does not require sealing to the MEMS structure. Also, the UV detector may be designed to measure UV-C radiation in a proportional mode so as to be a radiometer.

Figure 1:
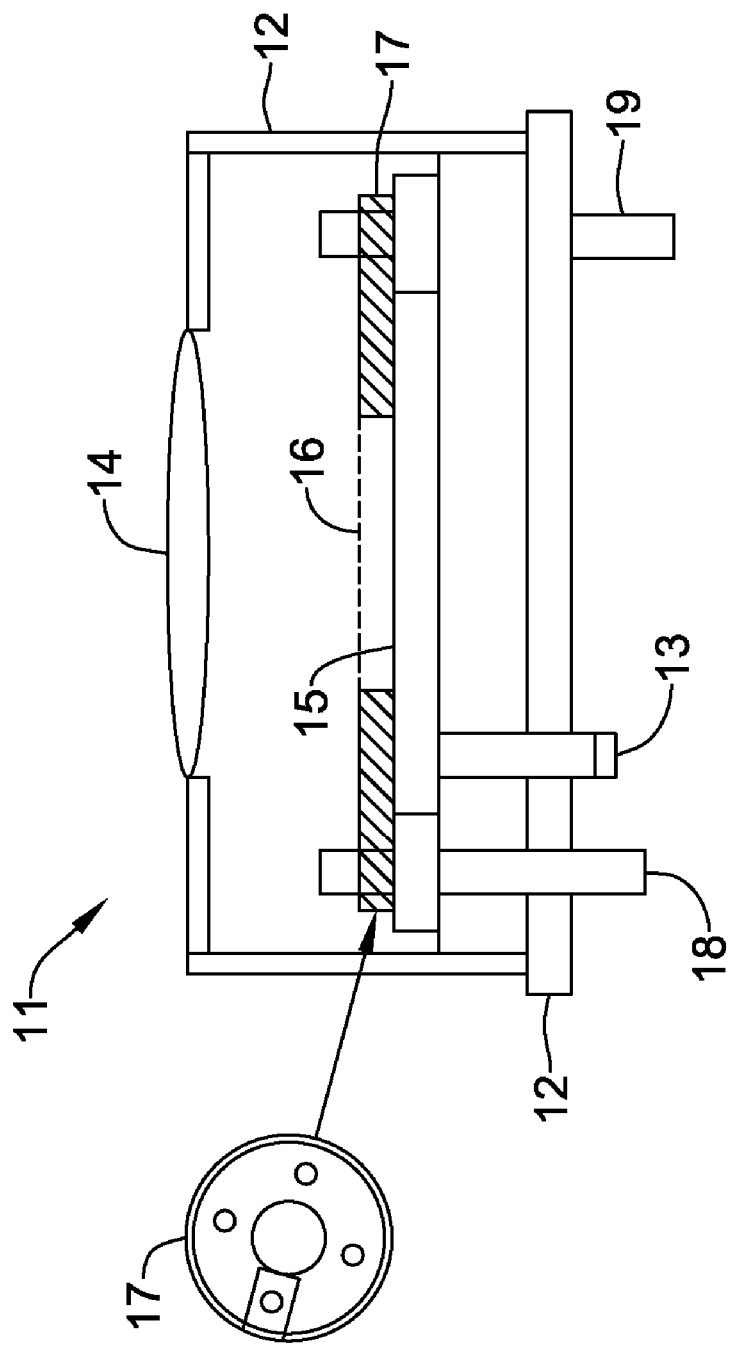
FIG. 1 is an illustrative sensor.

FIG. 1 is an illustrative example of a low cost high reliability UV light sensor 11. A package 12 may be a TO5, TO8 or similar type, which is hermetically sealable. The package 12 may have a port 13 for pumping out air, for example. There may be about 100 Torr of $Ne/H_2$. The package may include a UV transmissive lens or window 14 which may be made from silica or a special glass. An example of material for a lens or window for a present detector described in this application may include Schott™ (8337) glass. A cathode 15 may be a copper foil or thin plate held with mounting holes, tack, solder or braze. An anode 16 may be a mesh or screen stamped from a foil (or plated) with mounting holes, tack, solder or braze. Anode 16 may instead be a conductive sheet or layer (e.g., ITO) which is transmissive to the radiation of interest, such as UV light. There may be an isolator 17 situated between the cathode 15 and anode 16 for isolating the cathode and anode from each other. The isolator 17 may be made from ceramic or other low cost material having about a 500 micron thickness and with drilled mounting holes. It may another appropriate thickness, such as if the distance between the anode and cathode is less than 500 microns. Terminals 18 and 19 may be connected to the anode and cathode, respectively.

Figure 2:
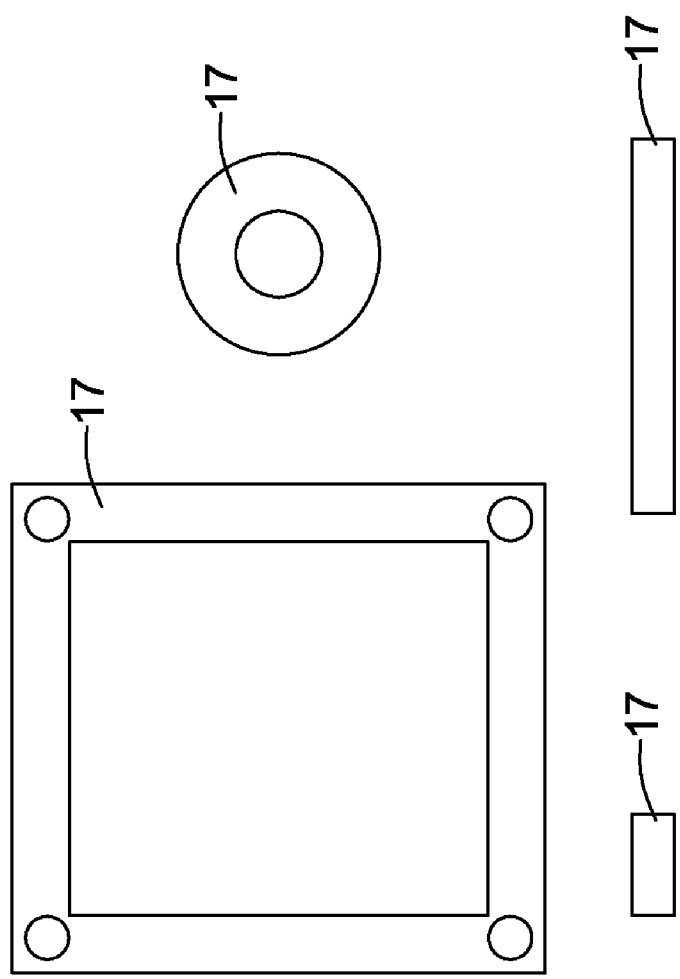
FIG. 2 shows sensor electrode isolators of various geometrics.

FIG. 2 shows isolators 17 of different geometries, rectangle, sticks washer, disk, and so forth, which may be used in sensor 11 of FIG. 1.

Figure 3:
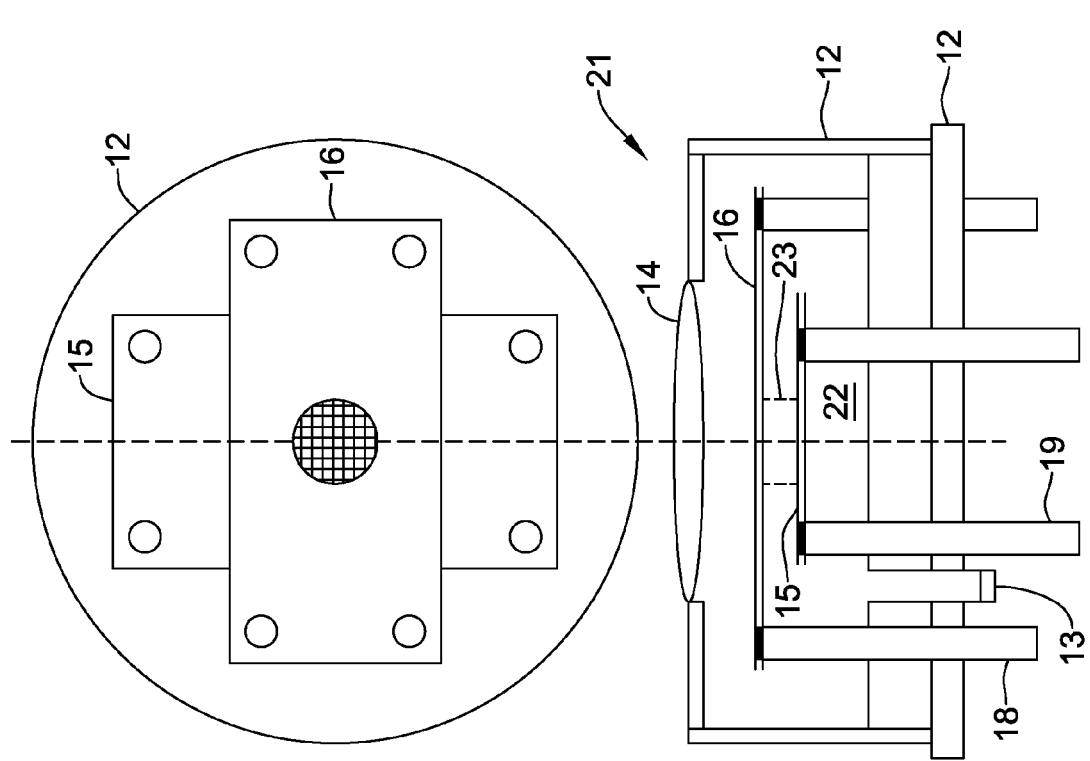
FIG. 3 shows two views of another illustrative sensor.

FIG. 3 shows another version 21 of the UV sensor. A cathode 15 may be plated on a low cost substrate 22. An anode 16 may be plated on a 500 micron thick substrate 23. Anode 16 and cathode 15 may be connected to terminals 18 and 19, respectively.

Figure 4:
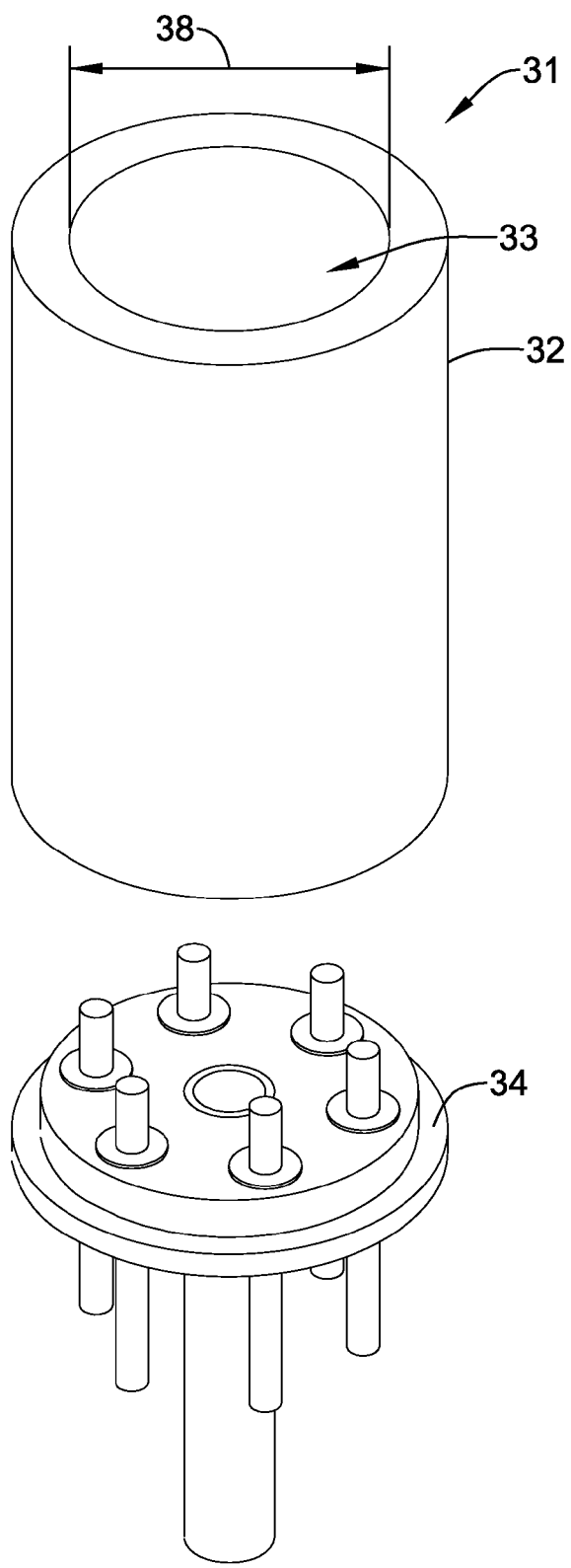
FIG. 4 reveals package components for sensor.
Figure 5:
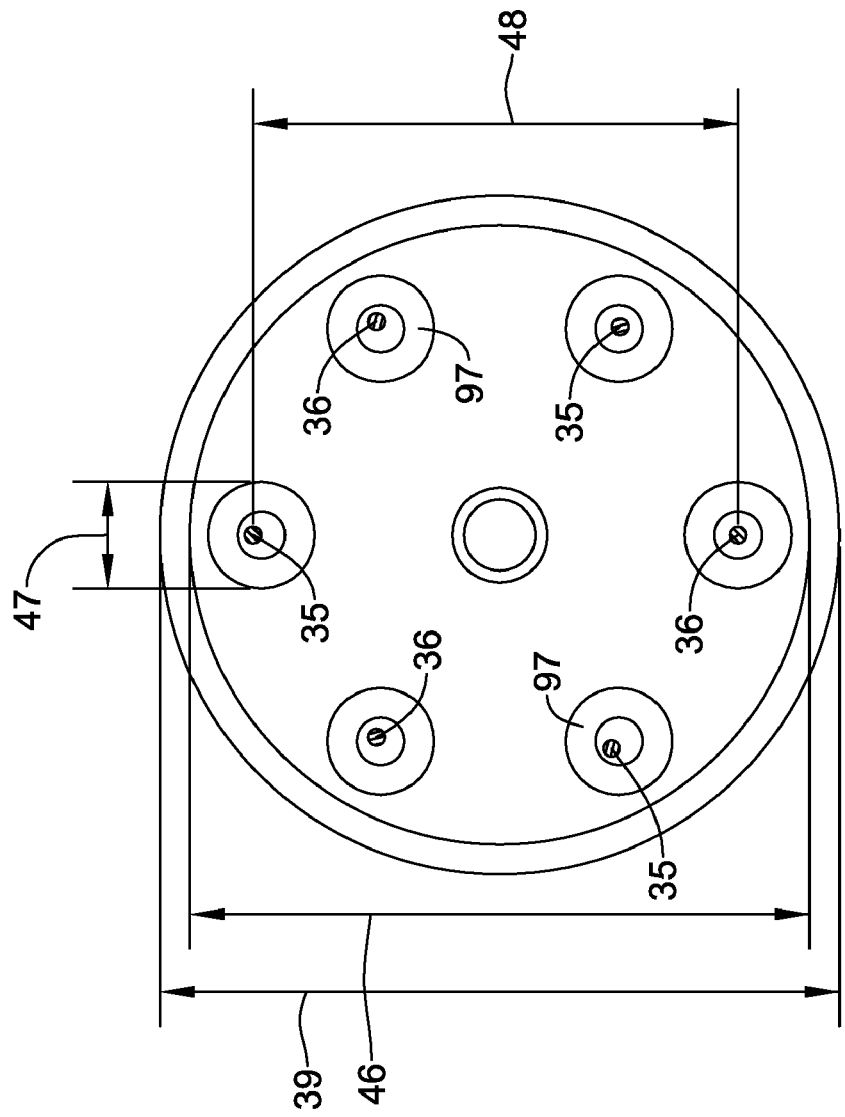
FIG. 5 is a top view of a package header for the sensor.
Figure 6A:
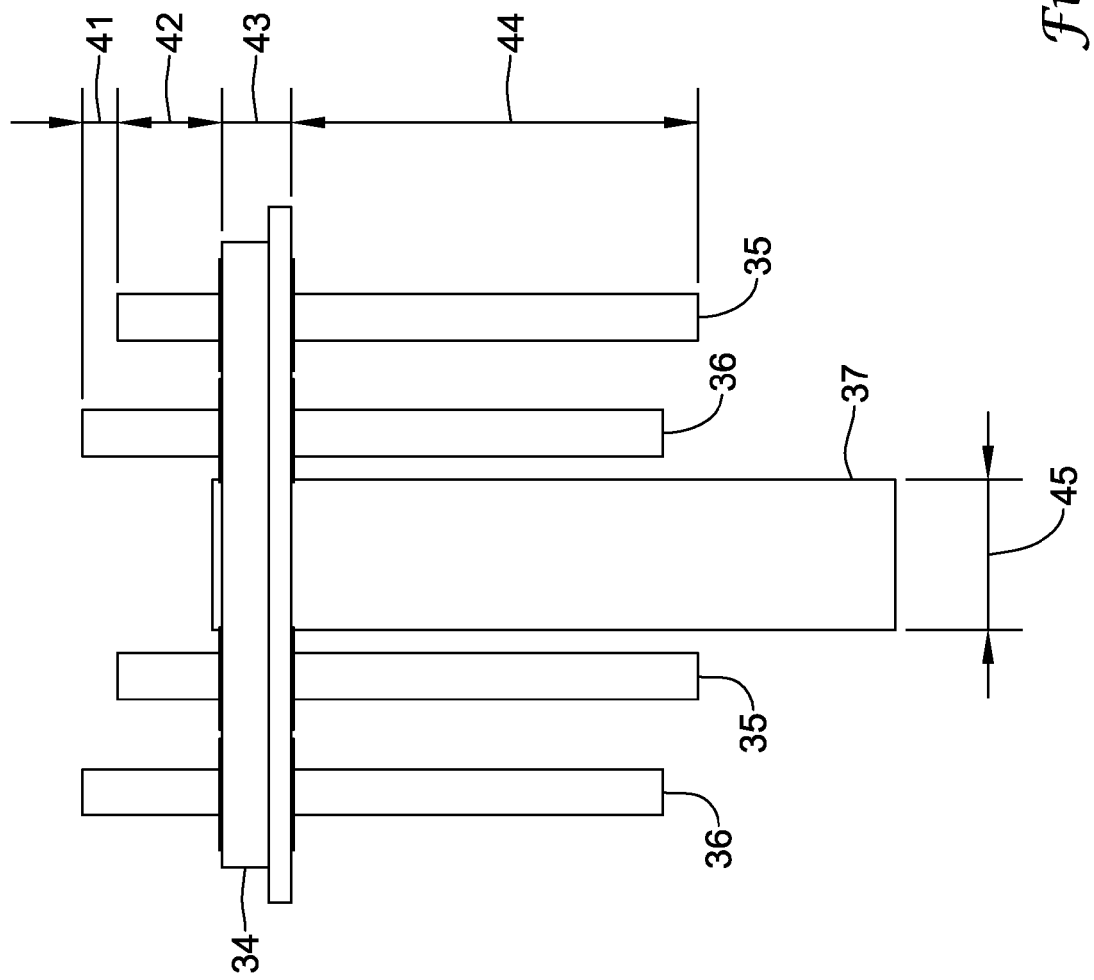
FIGS. 6a and 6b are side views of the package header.

FIG. 4 reveals components of a TO8 package 31 for a low cost UV sensor. The dimensions indicated in the present description are illustrative examples, but could be of other values. The package may include a 0.75 inch tall Kovar™ lid 32 with a 0.535 inch inside diameter and a 0.005 inch thick wall. The lid may be stamped rather than machined. At one end of the lid 32 is an opening 33 for a sapphire window or a Schott™ glass window. The window may be brazed to the lid. A glass or ceramic insulator might be placed inside of the package 31. Also, a TO8 Kovar™ header 34 with a 0.525 inch outside diameter flange is shown in FIGS. 4 and 5. The header may be stamped rather than machined. The lid may be projection welded to the header. The header 34 may have six 0.020 or 0.040 inch diameter pins at a distance of 0.380 inch between the pin centers. There are three pins 35 that are 0.024 inch lower in height than side of the flange, as shown in FIG. 6a. This pin height difference may instead be another amount between 0.005 inch and 0.100 inch. The pin height difference may dictate the spacing between the anode and cathode. The pins 35 and 36 may nickel plated, at least the portion of the pins inside the enclosure of the lid. The pins may be insulated from the flange by a ceramic or similarly effective material 97 around the pins and between the pins and the flange. There may be a projection in the lid flange center (not shown). The pins 35 and 36 may be identified with, for example, a stamping or color, e.g., red for pins 35 and green for pins 36.

In FIGS. 4 and 5, dimension 38 may be about 0.40 inch. Dimensions 39 and 46 may be about 0.60 inch and 0.525 inch, respectively. Dimension 47, which is the outside diameter of the pin 35 or 36 insulator, may be about 0.100 inch. The pin-to-pin centers at opposite sides of the flange may be about 0.380 inch, as indicated for dimension 48.

Figure 6B:
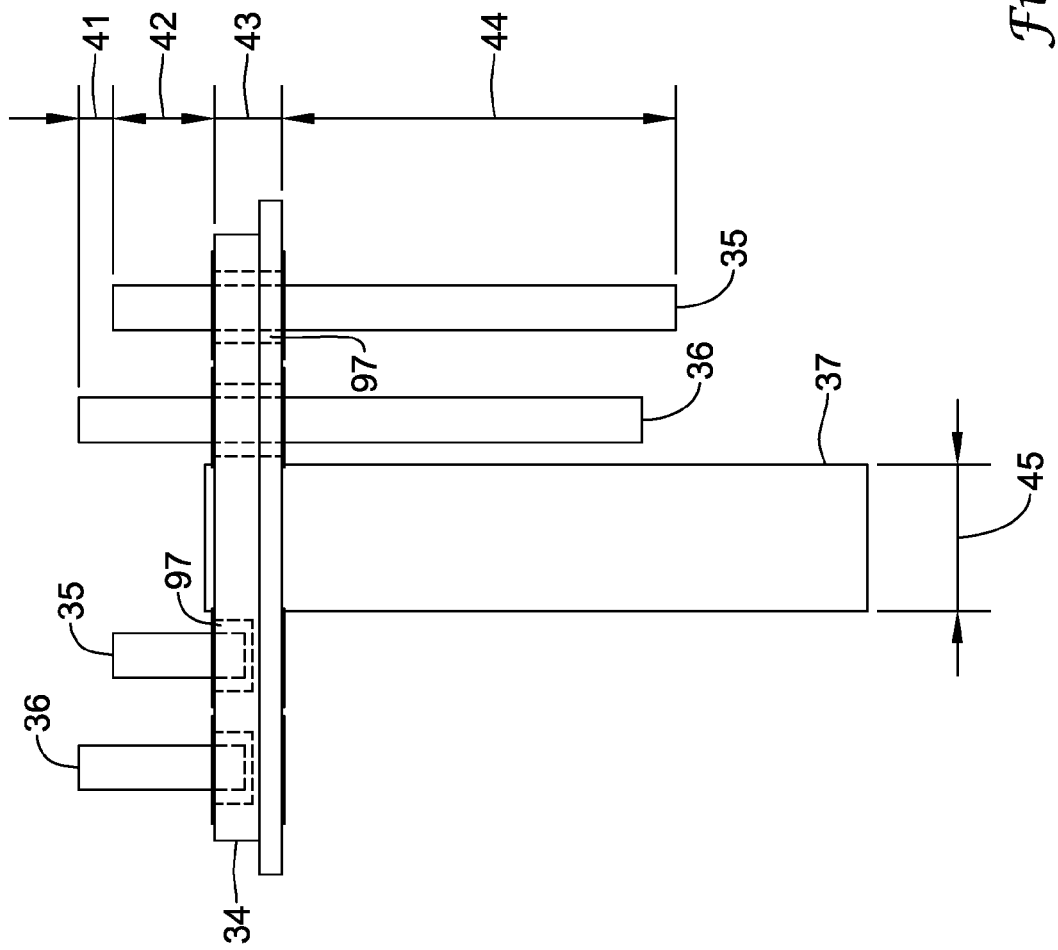

FIG. 6a shows a side view of flange 34. Dimension 41 may be 0.240 inch±0.0005 inch. Dimension 42 may be about 0.12 inch. Dimensions 43 and 44 may be about 0.060 inch and 0.25 inch, respectively. Tube 37 may have an outside diameter 45 of about 0.125 inch and a wall thickness of about 0.008 inch. The pins 35 and 36 may be supercut to about 0.001 inch in height tolerance and about 90 percent flat on top. The pins 35 and 36 may be electrodeless nickel plated Kovar™ pins. FIG. 6b shows the side view of FIG. 6a except only two pins 35 and 36 protrude through the flange to the bottom side for cathode and anode connection purposes.

Figure 7:
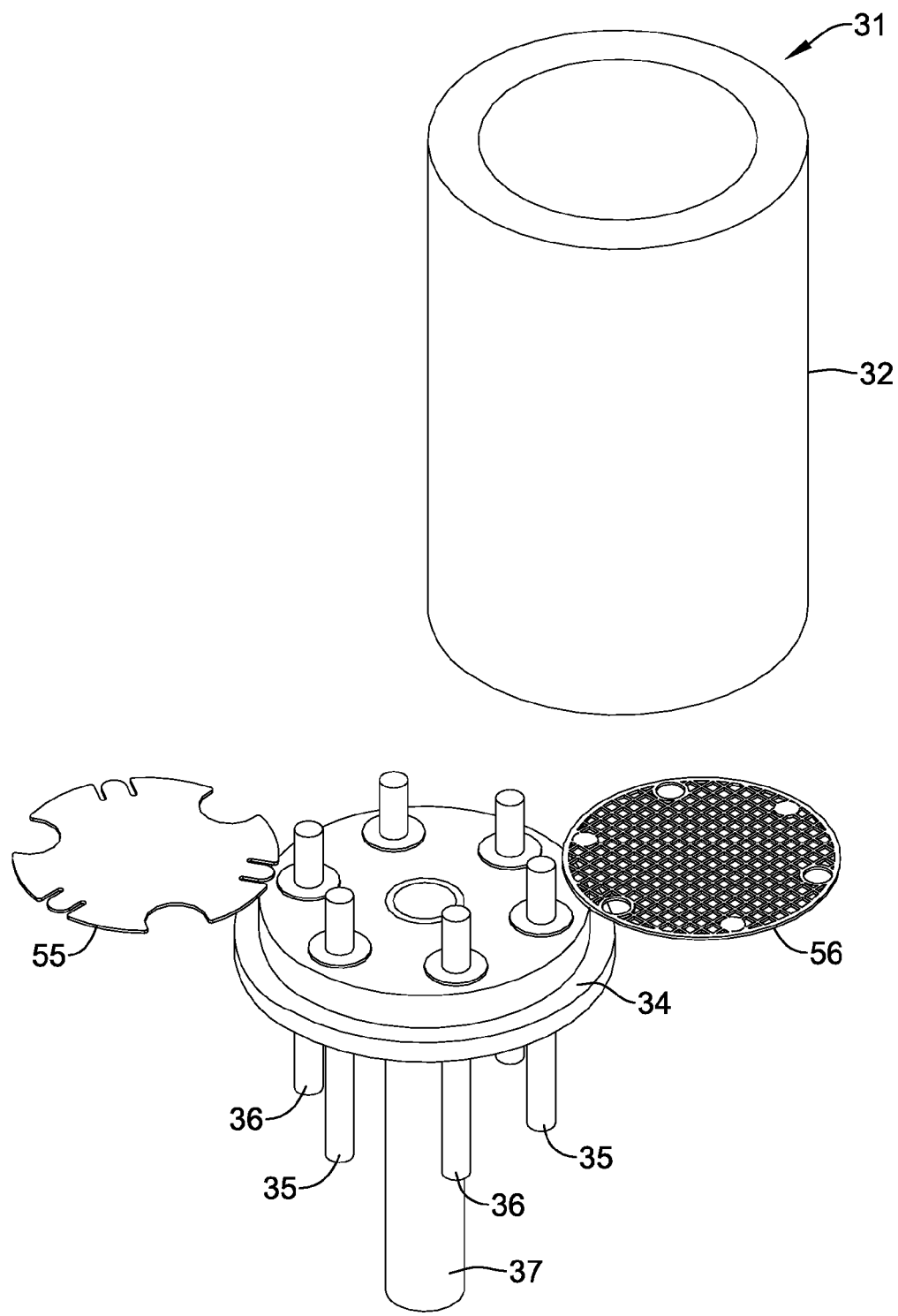
FIG. 7 shows a grid assembly of the sensor.
Figure 8:
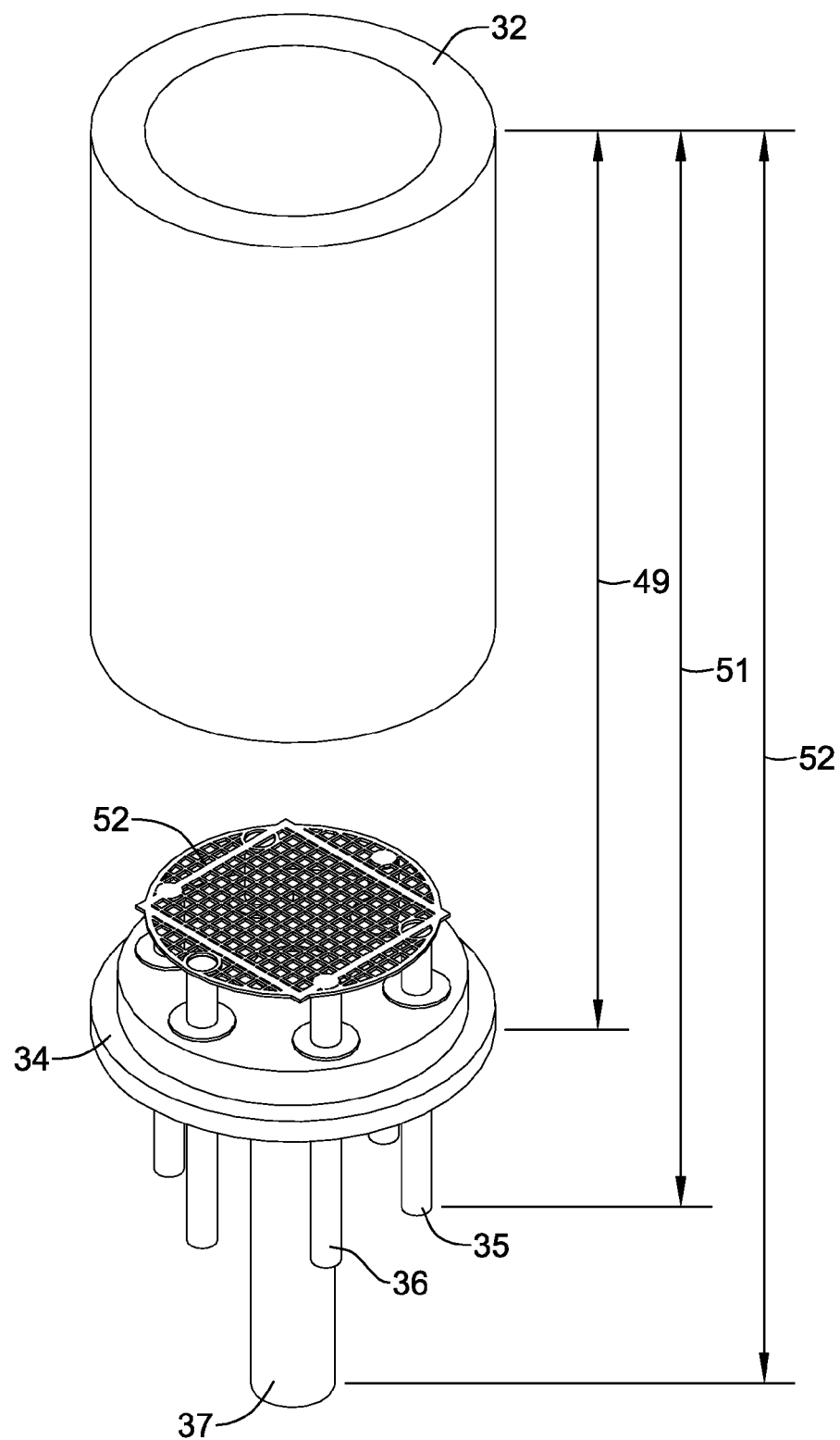
FIG. 8 shows an exploded view of a sensor assembly.

FIG. 7 shows a TO8 package 31 grid assembly pieces. FIG. 8 shows an exploded view of package 31 showing final dimensions when assembled. The height 49 from the top of lid 32 to the top of the outside edge of the flange 34 may be about 0.77 inch. Dimension 51 from the top of lid 32 to the bottom of a pin 35 may be about 1.10 inch. Dimension 52 from the top of lid 32 to the bottom of tube 37 may be about 1.4 inches before a pinch off of the tube.

Figure 9:
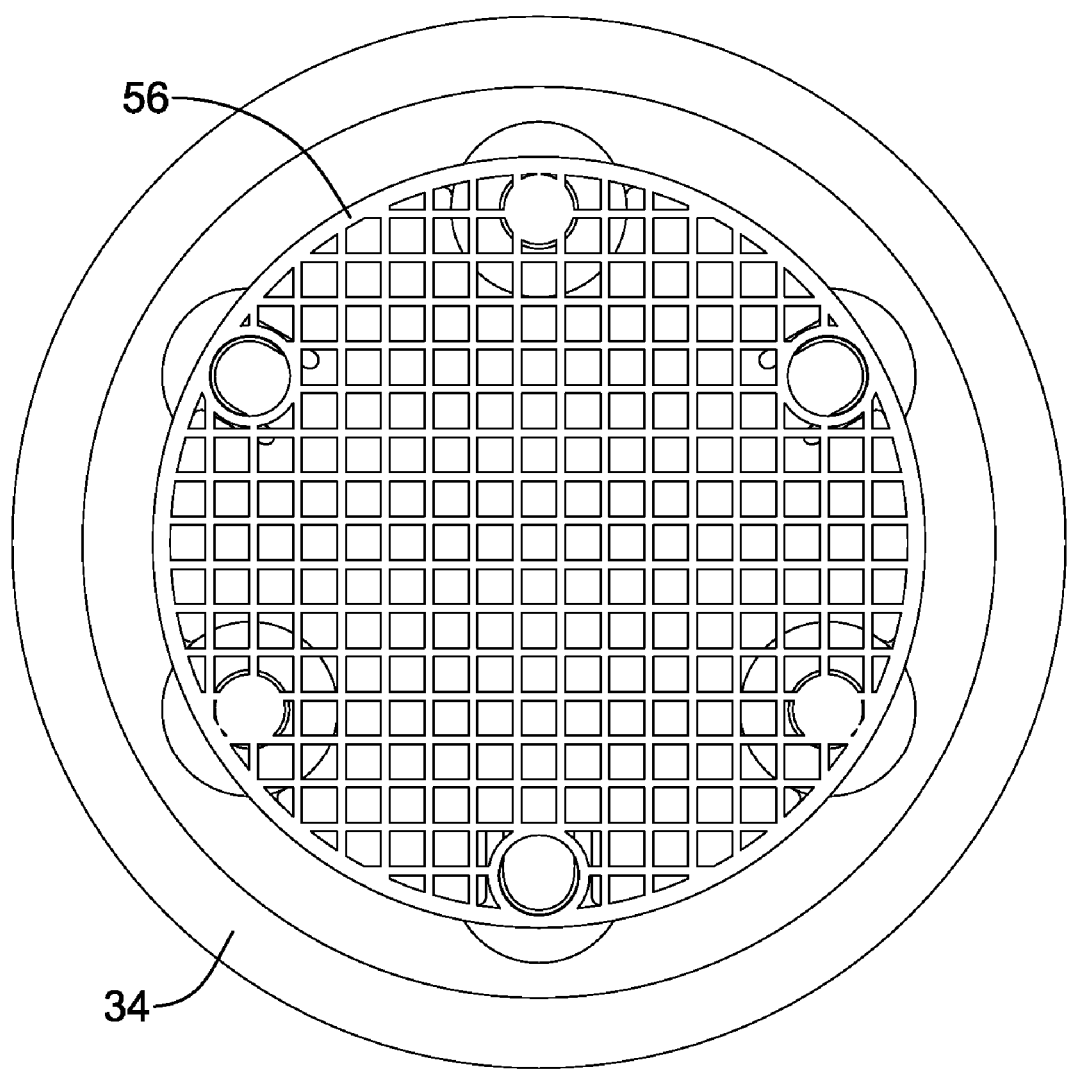
FIG. 9 reveals a top view of the anode grid on the package header.
Figure 10A:
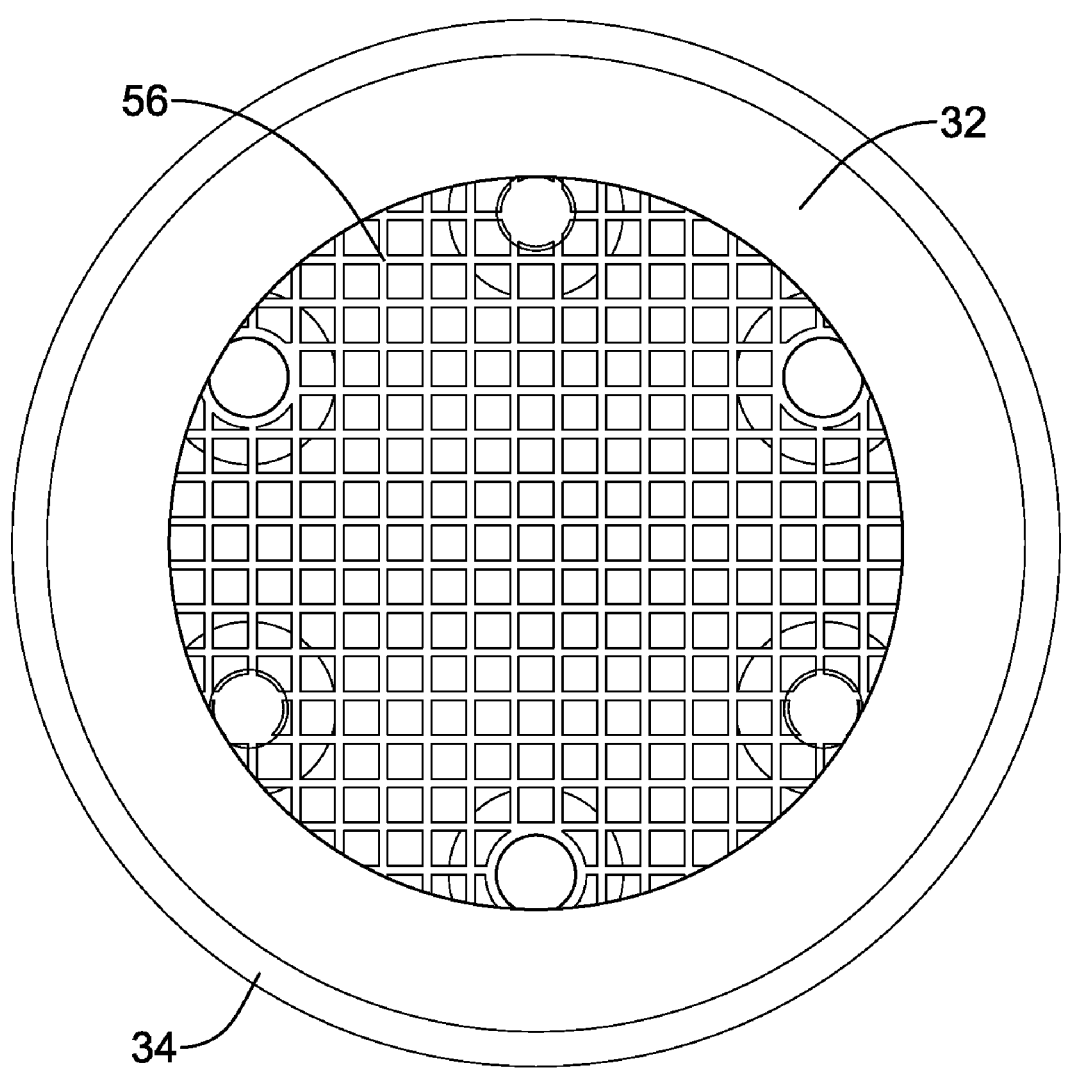
FIG. 10a reveals the same view as FIG. 9 except through a lid of the sensor package.
Figure 10B:
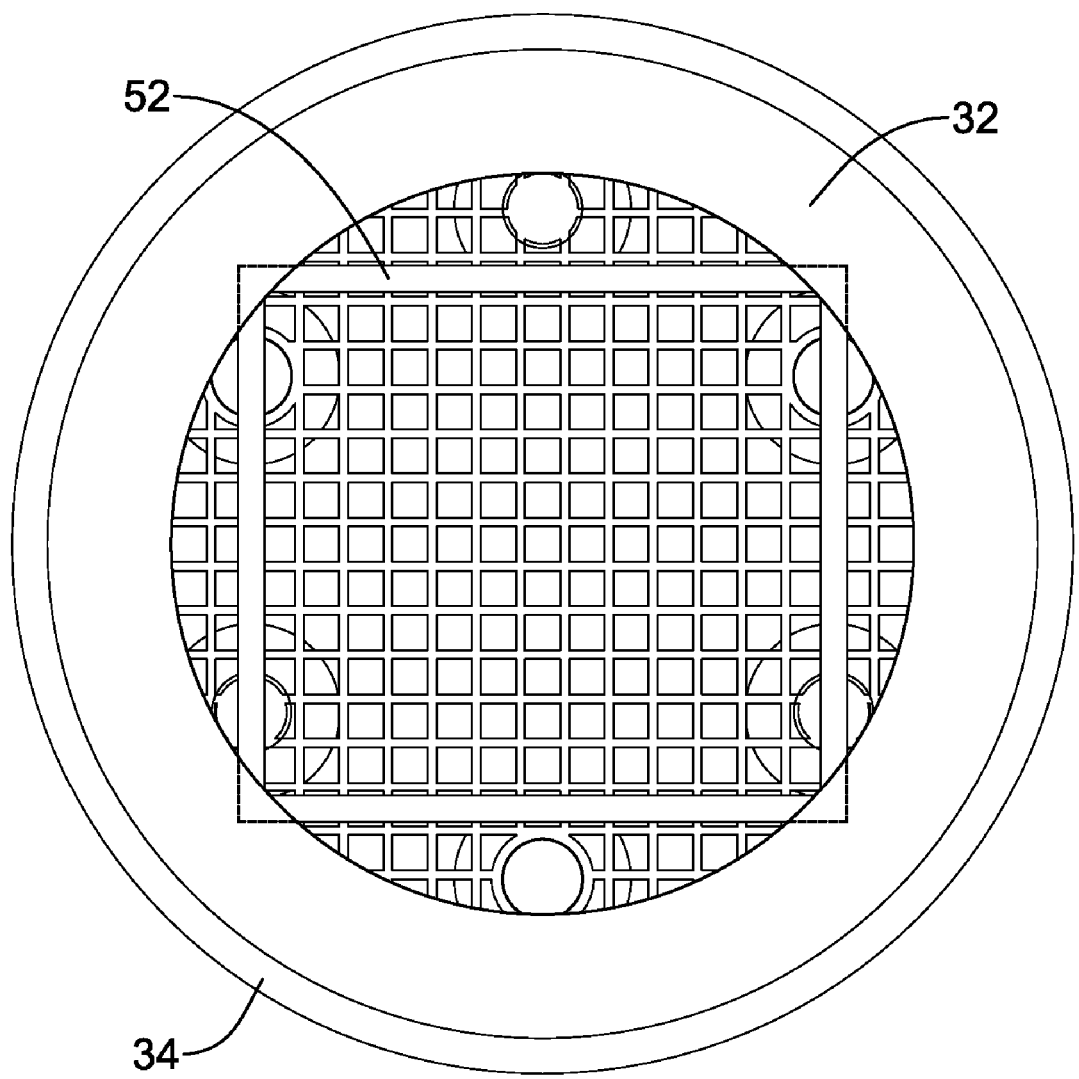
FIG. 10b is a similar view as FIG. 10a and shows a grid area of an older sensor.
Figure 11:
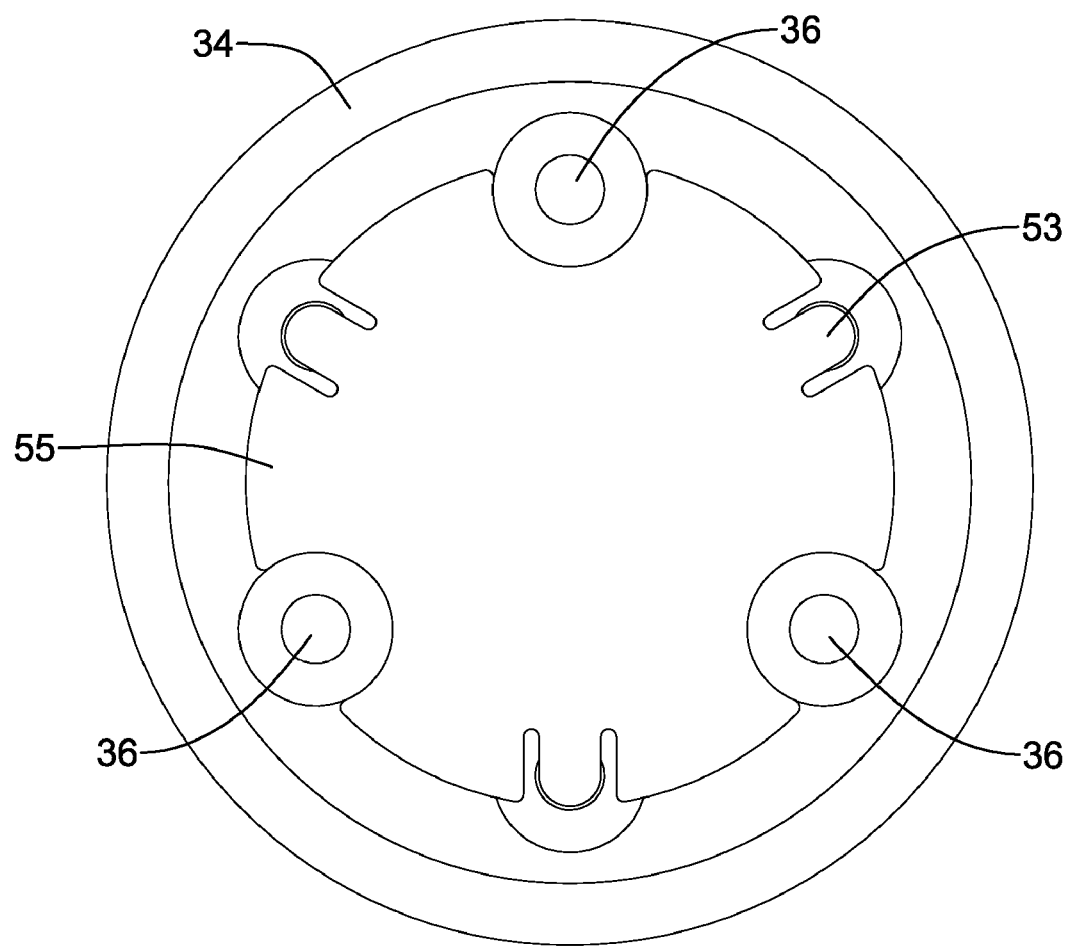
FIG. 11 shows a view of just a cathode situated on the package flange of the package header.
Figure 12:
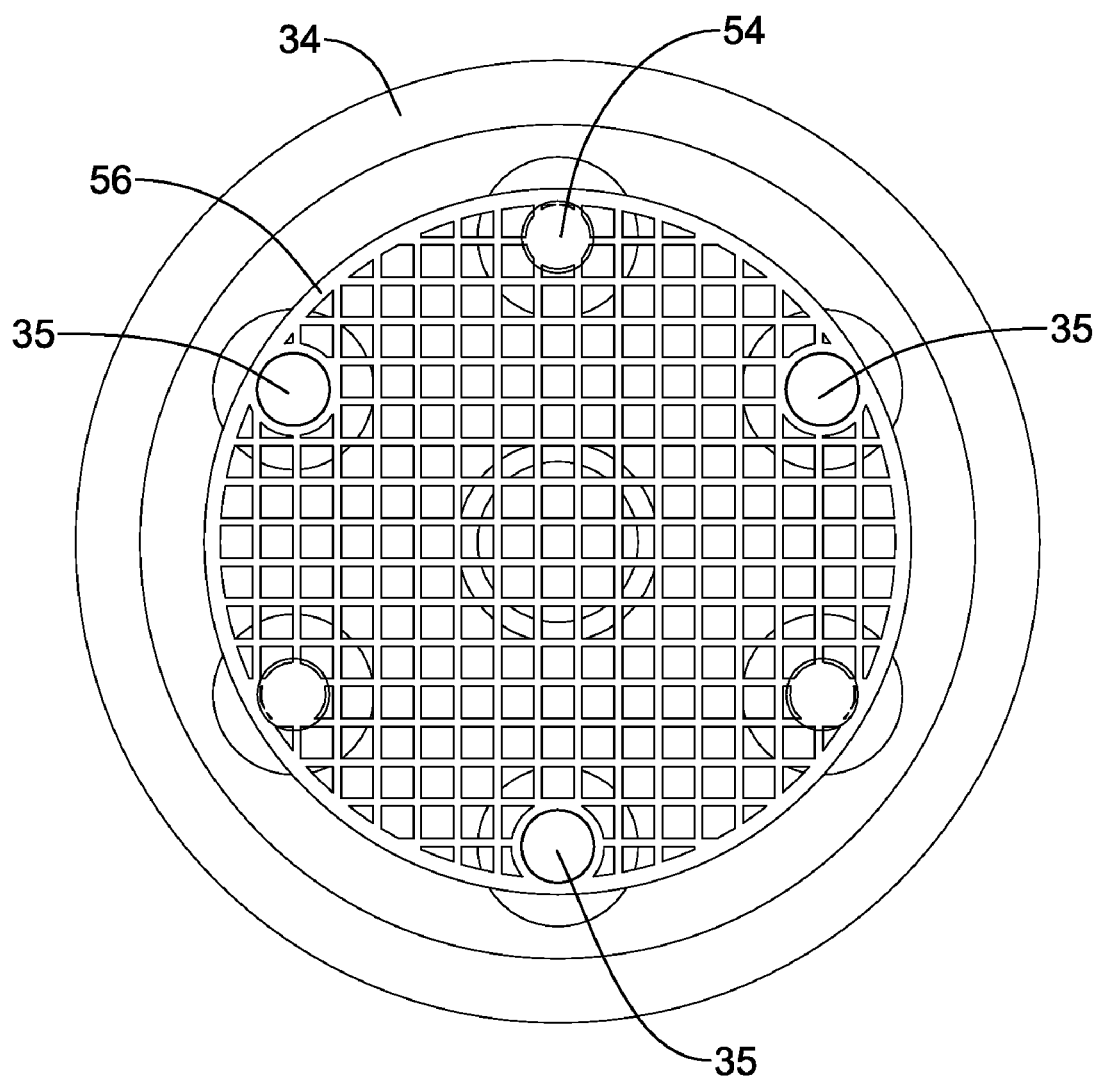
FIG. 12 shows a view of just the anode situated on the flange of the package header.

FIG. 9 reveals a new anode grid 56 area from looking down on the flange 34. FIG. 10a reveals the same view except through the lid 32. FIG. 10b is a similar view of an old grid 56 area 52. FIG. 11 shows a view of only a cathode 55 situated on flange 34 with finger-like portions 53 making contact with lower pins 35. FIG. 12 shows a view of only the anode grid 56 situated on flange 34 and having round surface portions 54 making contact with higher pins 36. There may be about 0.020 inch between the cathode 55 and anode 56. The distance between the high voltage and ground may be greater than 0.030 inch.

Figure 13:
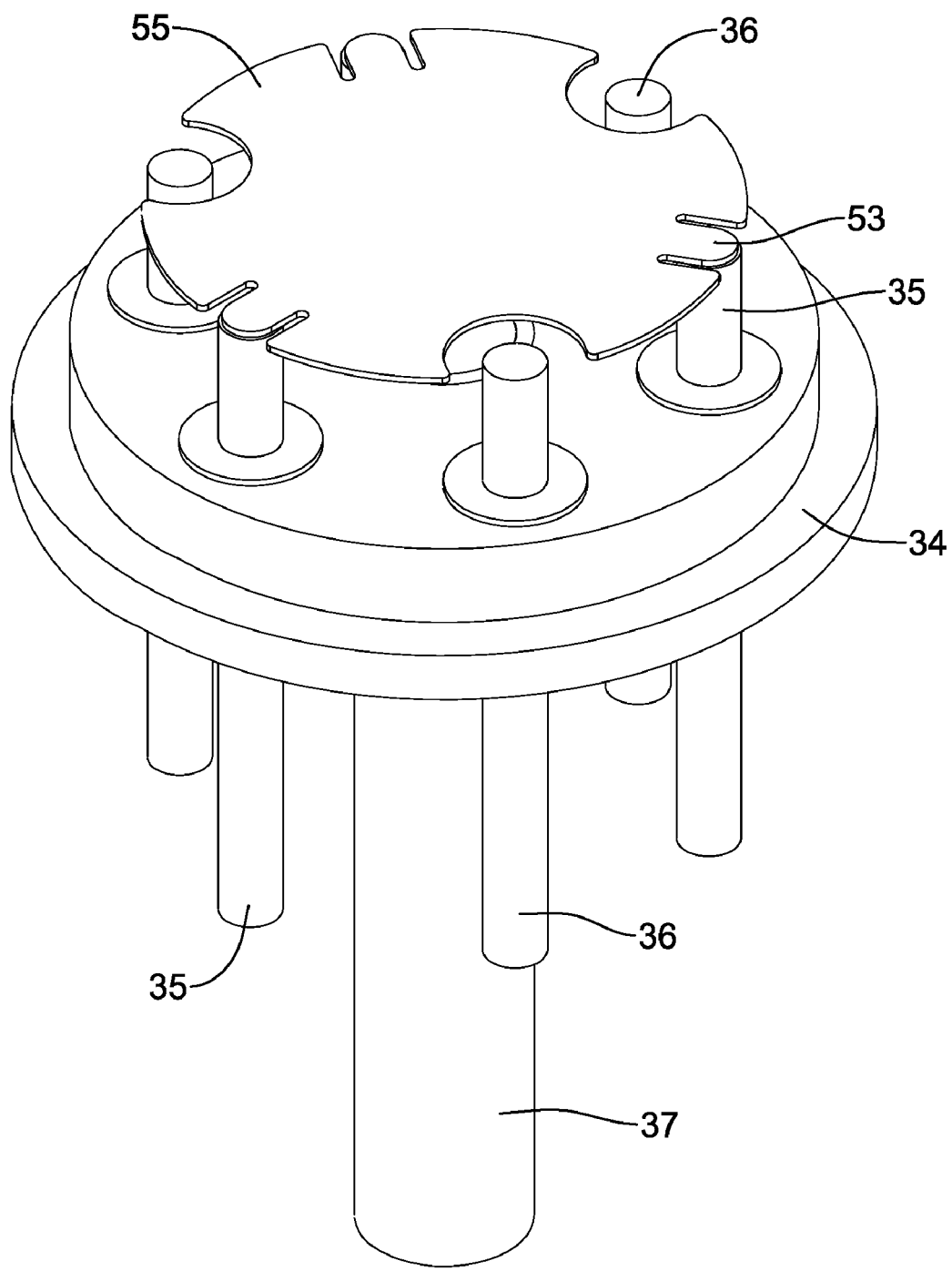
FIG. 13 is a perspective view of the cathode situated on a set of connecting pins of the header.
Figure 14:
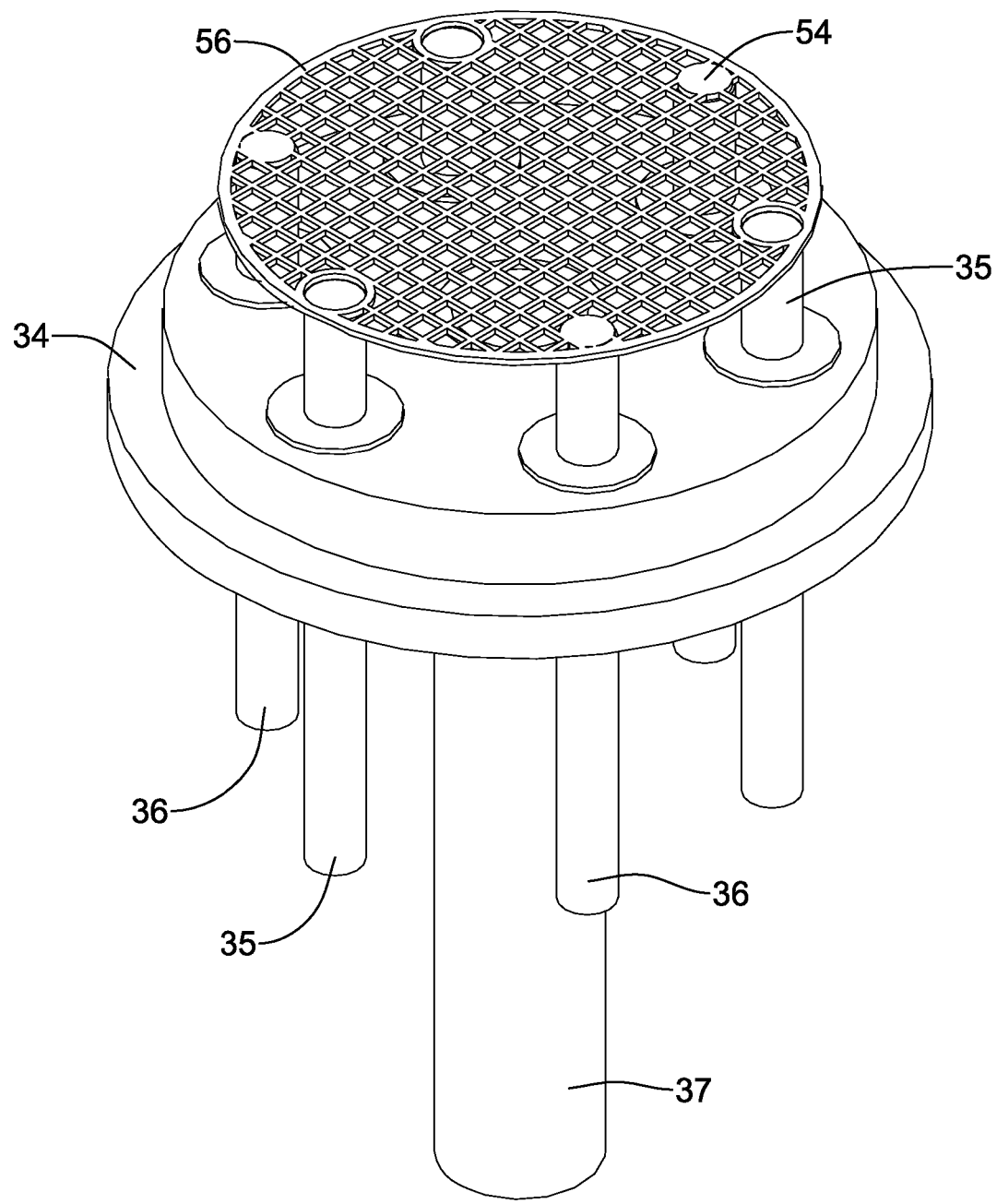
FIG. 14 is a perspective view of the anode situated on another set of connecting pins of the header.

FIG. 13 is a perspective view of the cathode 55 with portions 53 situated on the pins 35 of the flange 34. FIG. 14 is a perspective view of the grid 16 with portions 54 situated on pins 36 of the flange 34. Portions 53 may be for making electrical contact between cathode 55 and pins 35. Portions 54 may be for making electrical contact between anode 56 and pins 36.

Figure 15:
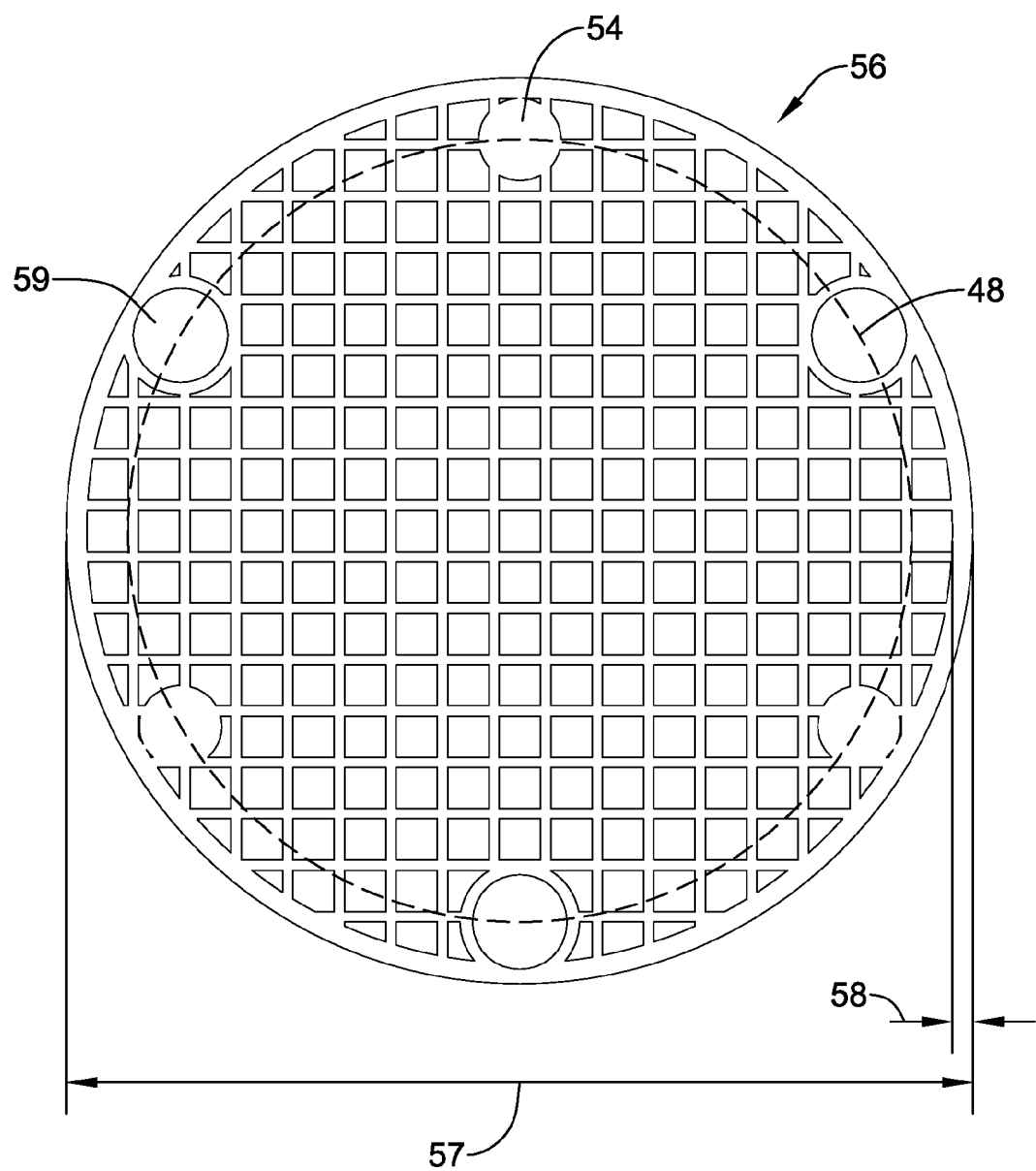
FIG. 15 is a plan view of the anode grid.
Figure 16:
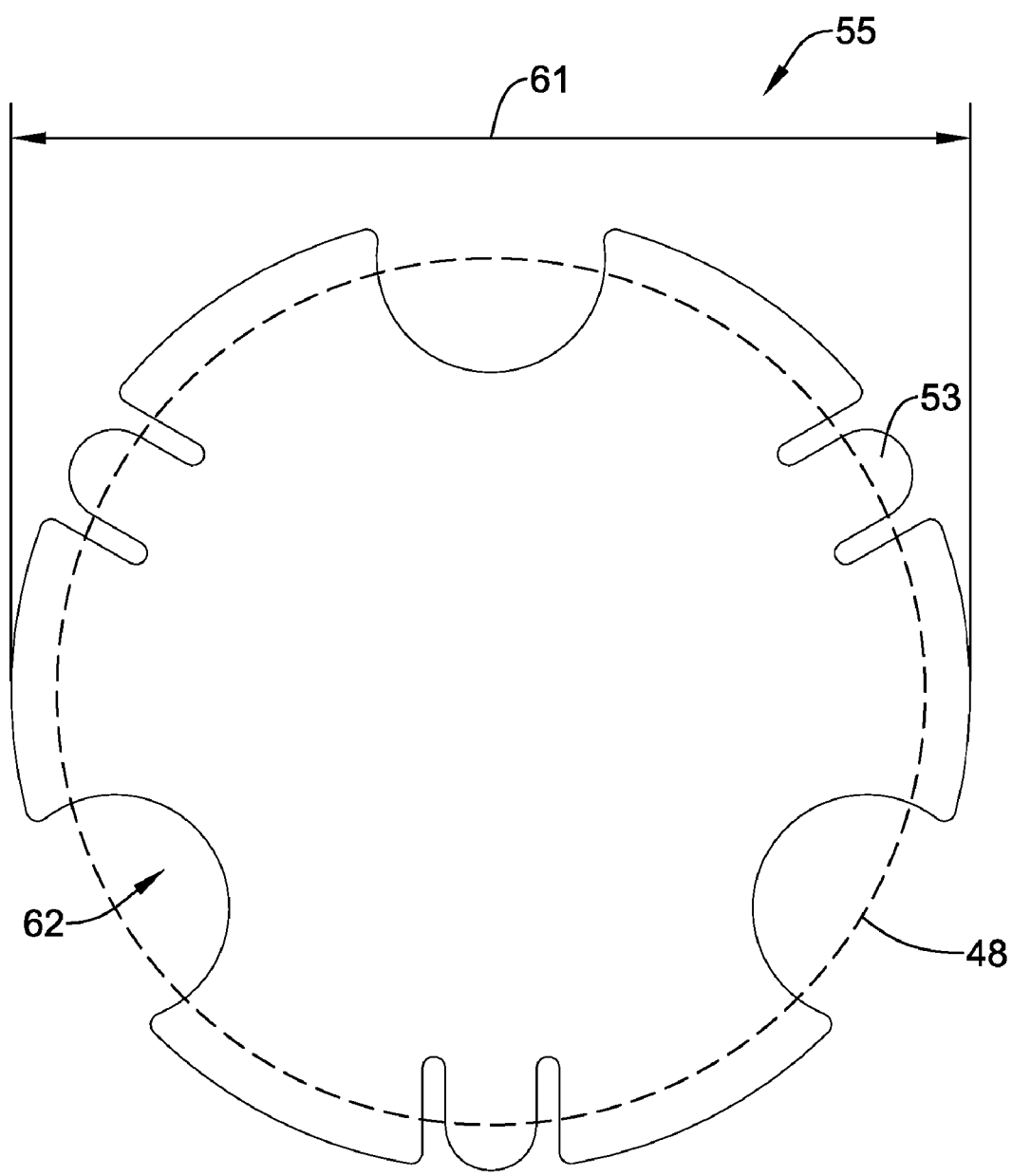
FIG. 16 is a plan view of the cathode.

FIGS. 15 and 16 show dimensions of the tungsten electrodes 56 and 55, respectively. The electrodes may each have a thickness of about 0.05 inch. Grid 56 may have an outside diameter of dimension 57. The outside ridge of anode 56 may have a width dimension 58 of about 0.010 inch. The dimension 48 may be a diameter or distance between centers of portions 54 (or between centers of opposing pins 35 or 36 above). Holes 59 proximate to pins 35 may have an outside diameter of about 0.058 inch and an inside diameter of about 0.046 inch. Portions 54 may have an outside diameter of about 0.040 inch. The screen of grid 56 may have square portions 59 of grid and have border pieces with a width of about 0.005±0.0005 inch and a thickness of about 0.004±0.0007 inch. The centers of the square portions 59 may be about 0.025±0.0005 inch apart.

An outside dimension 61 of cathode 55 in FIG. 16 may be about 0.42 inch. Openings 62 for pins 36 may have a cut at a radius of about 0.050 inch. The edges of opening 62 at the outside of cathode 55 may have a radius of about 0.005 inch. Portion 53 may have an outside center shape of a radius of about 0.020 inch. The other cuts about portion 53 on the inside and outside edges may have a radius of about 0.005 inch.

The steps of assembling sensor 31 may include cleaning the cathode 55 and anode 56. Then the cathode 55 may be spot-welded to pins 35 and the anode 56 may be spot-welded to pins 36. The lid 32 may be projection welded to the TO8 flange 34. It may instead be attached in another manner. The assembly 31 may be attached to a manifold to be baked at 400 degrees C. $H_2$ plus gas fill at 25' may be provided. Then tube 37 may be pinched off. Assembly 31 may be removed from the manifold and tested.

Another aspect of the present invention may include not having to seal to the MEMS device of the UV sensor for the hermetic seal of the package. The sensor may be regarded as a mini-UV tube which has a hermetic package used to contain Ne/$H_2$ gas. The MEMS structure mounted in the package may provide the required spacings and electrodes but does not necessarily need to provide the basis for a seal.

Figure 17:
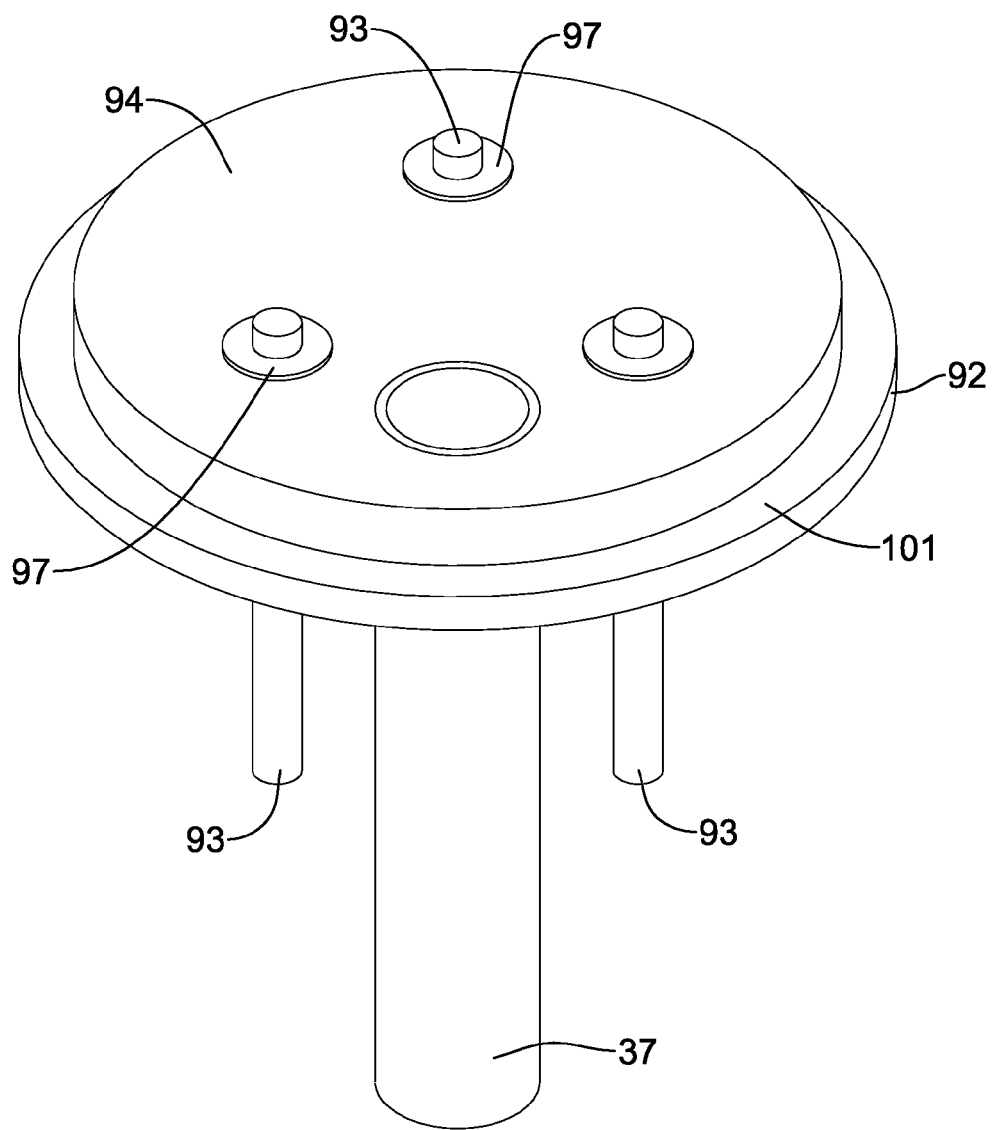
FIG. 17 shows another type of header having three pins through the header.

FIG. 17 shows another type of header 92 having three pins 93 through the header. The pins may have height of 0.024 inch above a header plane 94 of the header 92. However, the height of the pins 93 may be between 0.005 inch and 0.100 inch. Each of the pins 92 may be insulated from the header 92 with a ring or circular barrier 97 of ceramic (or another insulator material) between the respective pin and header. The pins and the header may be fabricated from Kovar™ or equivalent material. The pins 93 may be nickel plated. The dimensions of header 92 may be similar to the dimensions of header 34 described herein. It may also have a tube 37 for gas addition or removal and sealing.

Figure 18:
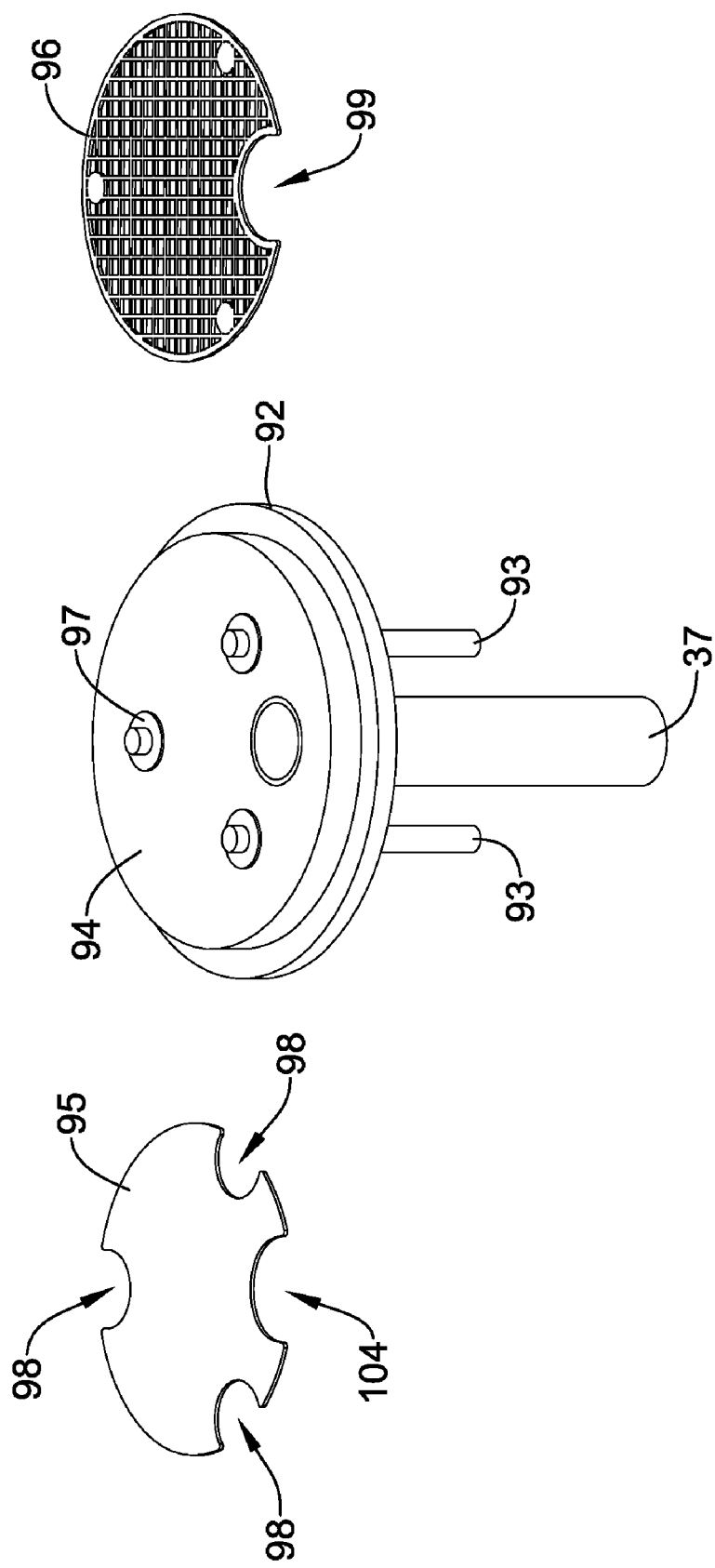
FIG. 18 shows the basic internal parts for the sensor using the three pin header.

FIG. 18 shows the basic internal parts for the sensor using the three pin header 92. The parts include a tungsten cathode 95 and a nickel or tungsten anode 96. The cathode and anode may be fabricated from other appropriate materials. The cathode 95 may be placed on and attached to the plane surface 94 of header 92. The attachment of the cathode to the header may be a weld. The cathode 95 may have cutout areas 98 with clearances for the pins 93 and a cutout area 104 for the opening of tube 37. The header body 92 in this version may be at the same voltage potential as the cathode. However, to isolate the cathode potential from the header, the center portion of the header floor or plane 94 may be isolated from the outside part of the header 92 with a ceramic ring (or other insulation) with the cathode 95 welded to the inner metal part. Provisions may be made for a connection with the cathode 95 outside of the sensor body. The anode 96 may be placed on the pins 93 which maintain the appropriate distance from the cathode 95. Anode 96 may have a cutout to make room for an opening of the tube 37. An electrical connection to the anode 96 may be made through one of the pins 93.

Figure 19:
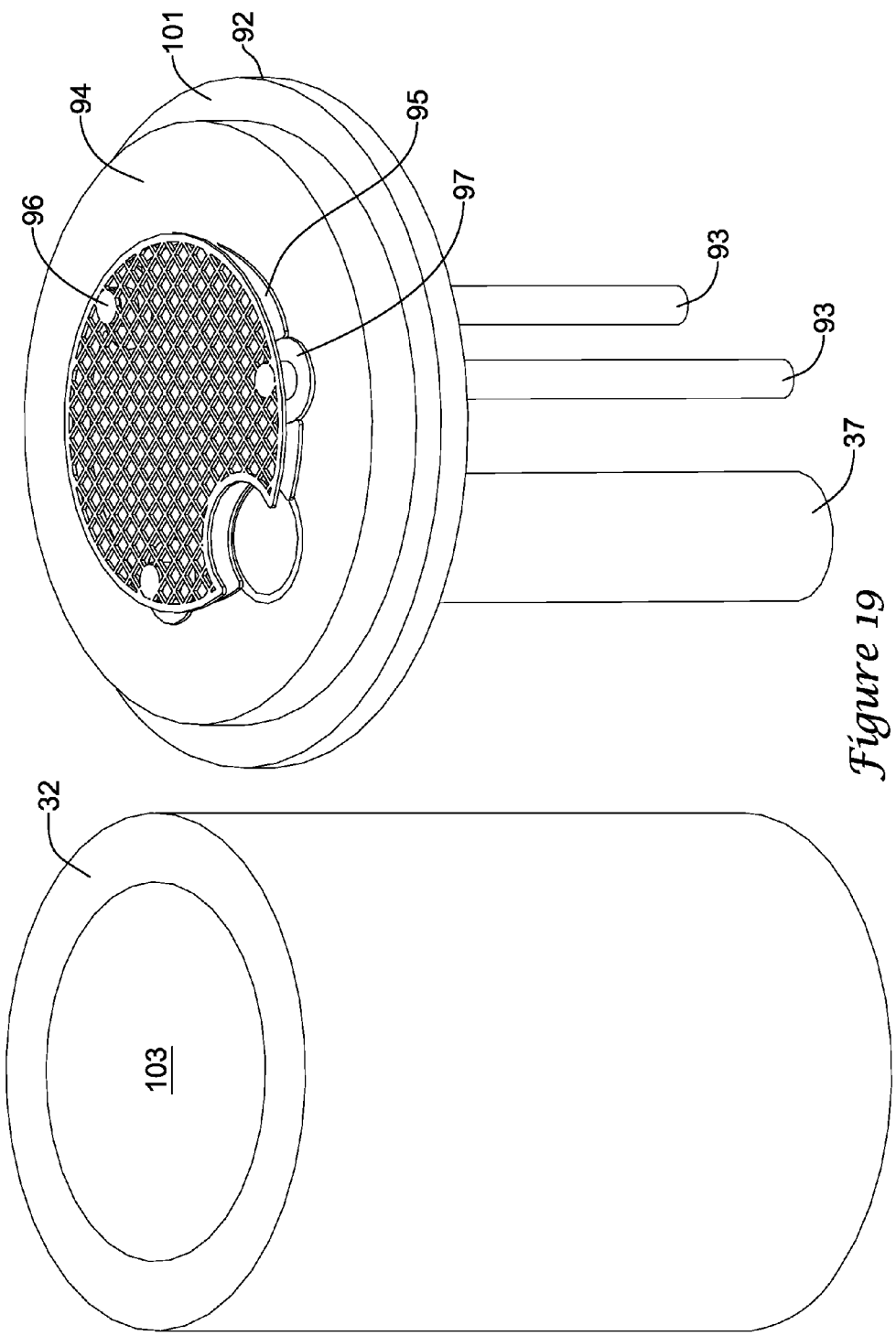
FIG. 19 shows the header with the cathode and anode in placed on the three pin header.

FIG. 19 shows the header 92 with the cathode 95 and anode 96 in placed on the header 92. Placed on a flange 101 of header 92 may be the lid 32 which is described herein and shown in FIG. 21 as enclosed sensor 102. The lid 32 may have a window 103 at the top. The lid 32 may be projection welded to the header at the flange. If the cathode and header are electrically connected, the lid 32 may act as a cathode loop. Gas may be added to the enclosure of sensor 102, formed by the lid 32 and header 92, in an appropriate quantity, mixture and pressure as for similar sensors described herein. After the gas placement in the enclosure, the tube 37 may be closed or pinched off to hermetically seal the sensor enclosure.

Figure 20:
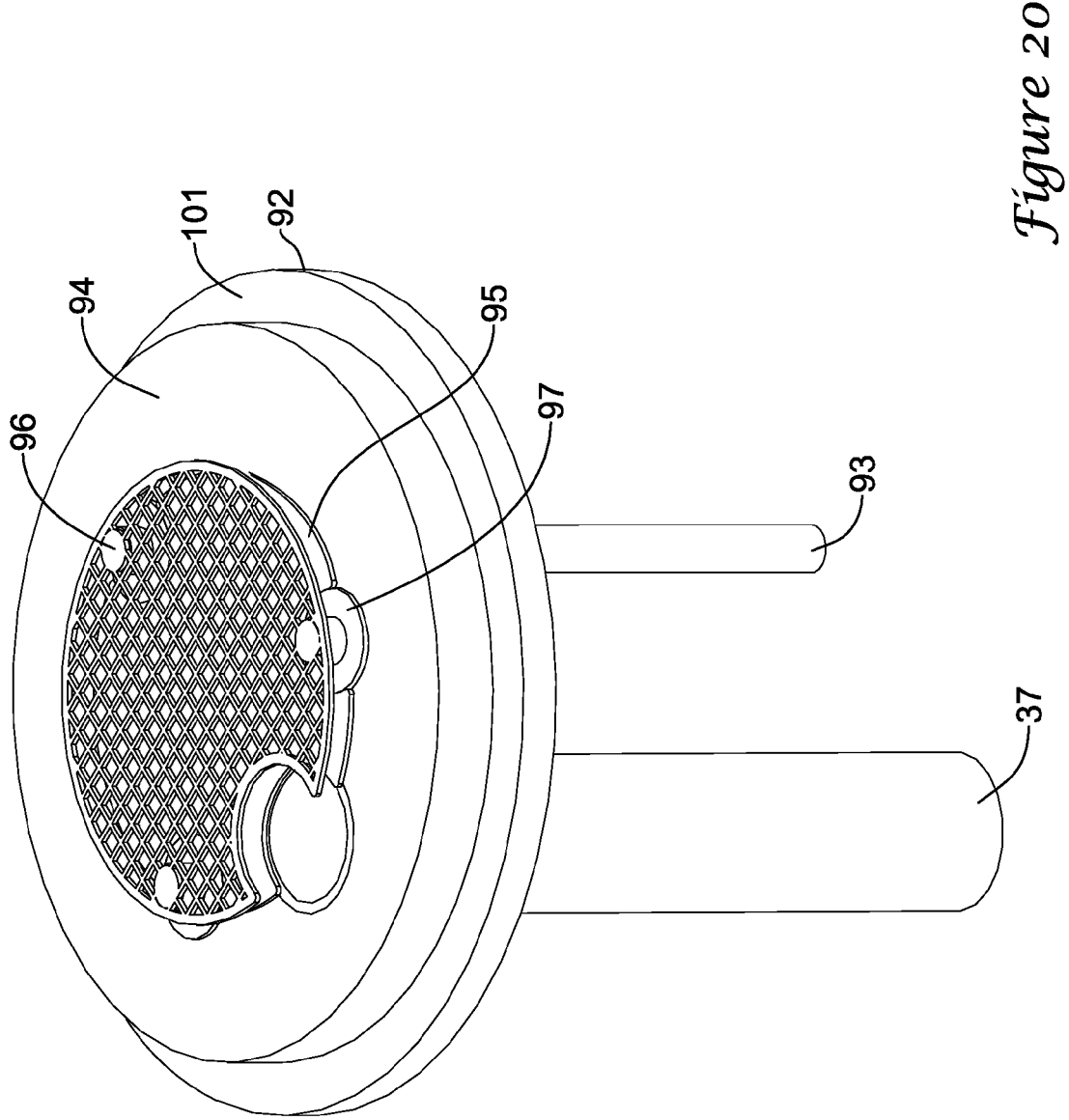
FIG. 20 shows the sensor with just one external pin connected to the anode.

The sensor of FIG. 20 may have only one external pin 93 connected to the anode 96. The other pins 93 may be placed and insulated from the header in the same manner as several pins 35 and 36 in the left side of header 34 in FIG. 6b.

Figure 21:
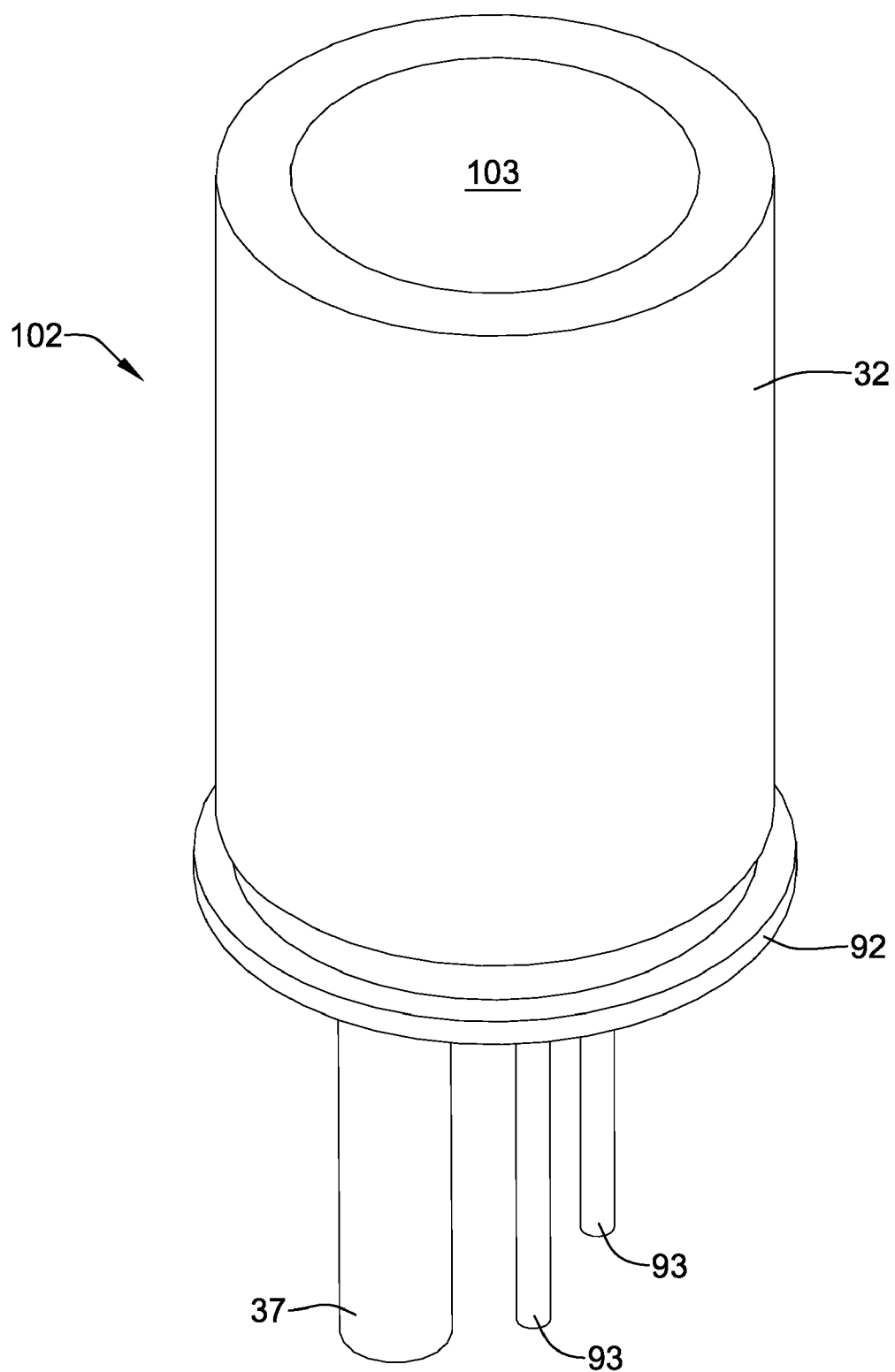
FIG. 21 reveals the hermetically enclosed sensor having the lid welded and sealed to the flange of the three pin header.

FIG. 21 reveals the hermetically enclosed sensor 102 having the lid 32 welded and sealed to the flange 101 of header 92. Lens 103 may be transmissive to the light or radiation which the sensor 102 is designed to detect.

Figure 22A:
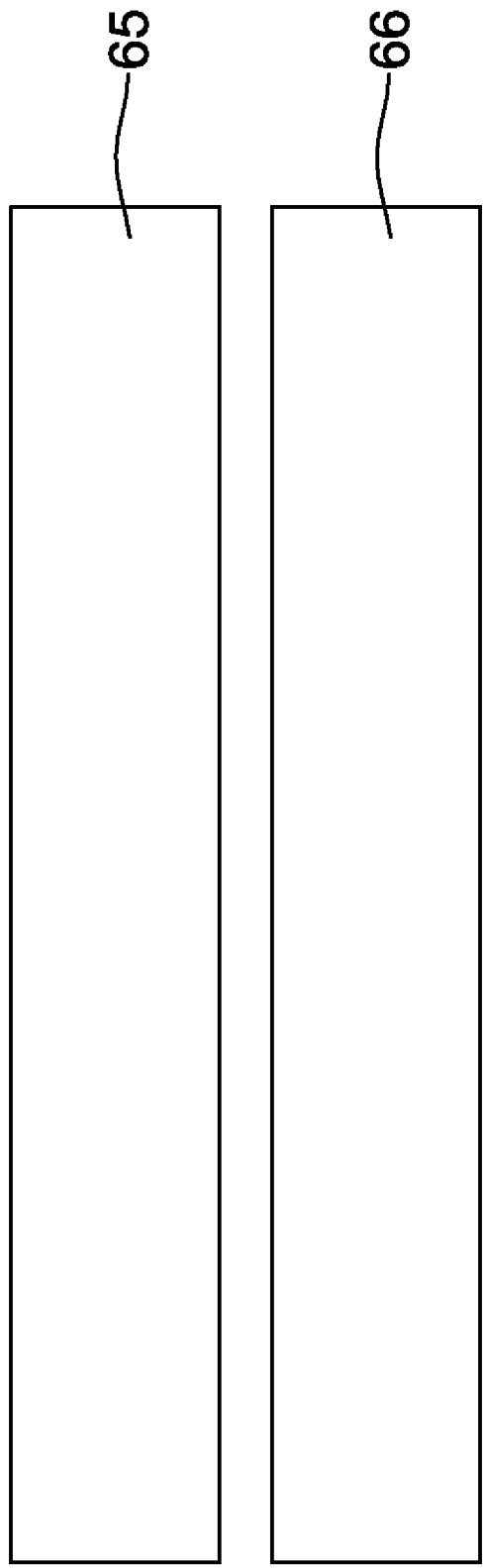
FIGS. 22a, 22b and 22c show steps of fabrication for a sensor having MEMS elements.
Figure 22B:
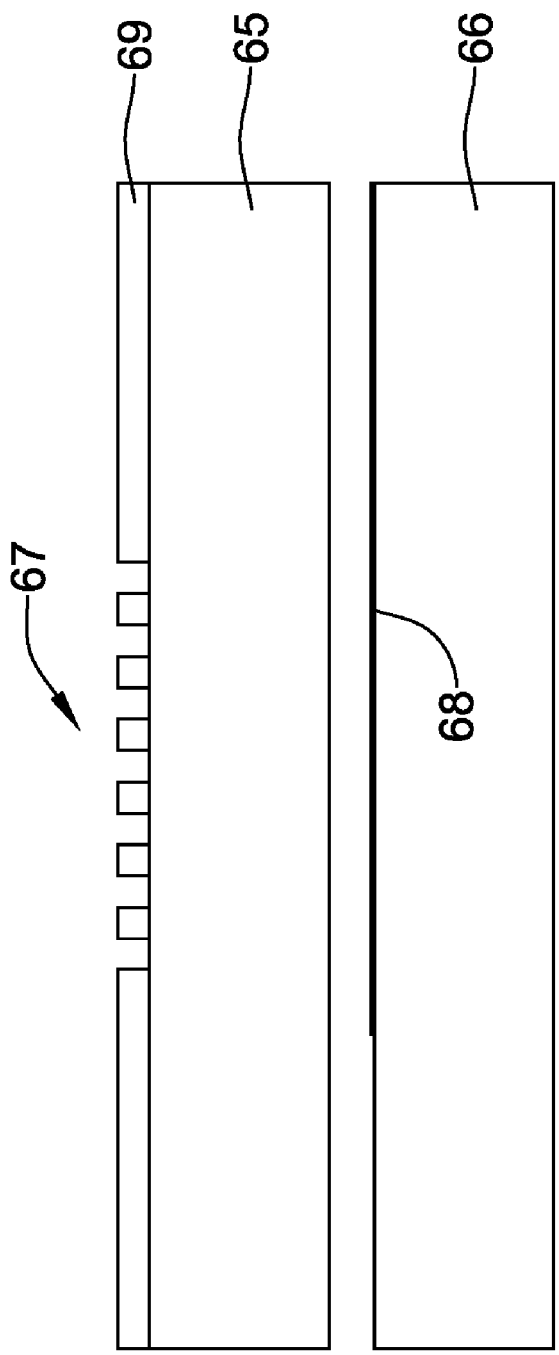
Figure 22C:
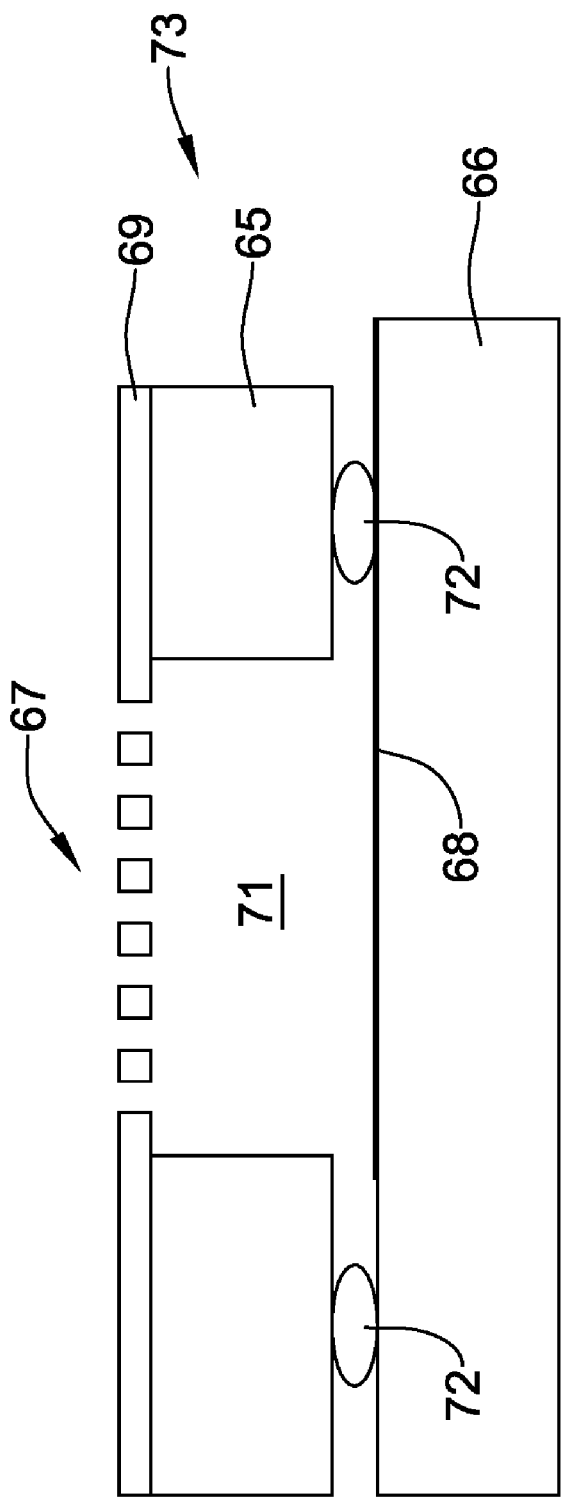

FIGS. 22a, 22b, 22c and 23a illustrate a fabrication and assembly of the UV sensor with a MEMS structure. A silicon substrate 65 and a Pyrex™ or silicon substrate 66 are obtained in FIG. 22a. In FIG. 22b, an anode grid 67 may be formed of an electroplated or mesh copper 69 which may be regarded as the anode, or formed with alternative approaches, such as a sheet or layer 87 of light transmissive (e.g., UV) conductive material on silicon wafer 65. A tungsten layer or electrode 68, such as a cathode, may be deposited or formed on substrate 66. A portion of the silicon substrate 65 under grid 67 of anode 69 may be etched away with an RIE or plasma etch to provide a free standing grid 67 over an etched-out space 71. Wafers 65 and 66 may be bonded together by fritting or anodic bonding 72 as shown in FIG. 22c. The distance between the anode 69 and the cathode 68 may be between 0.005 and 0.100 inch. An example distance may be 0.020 inch.

Figure 23A:
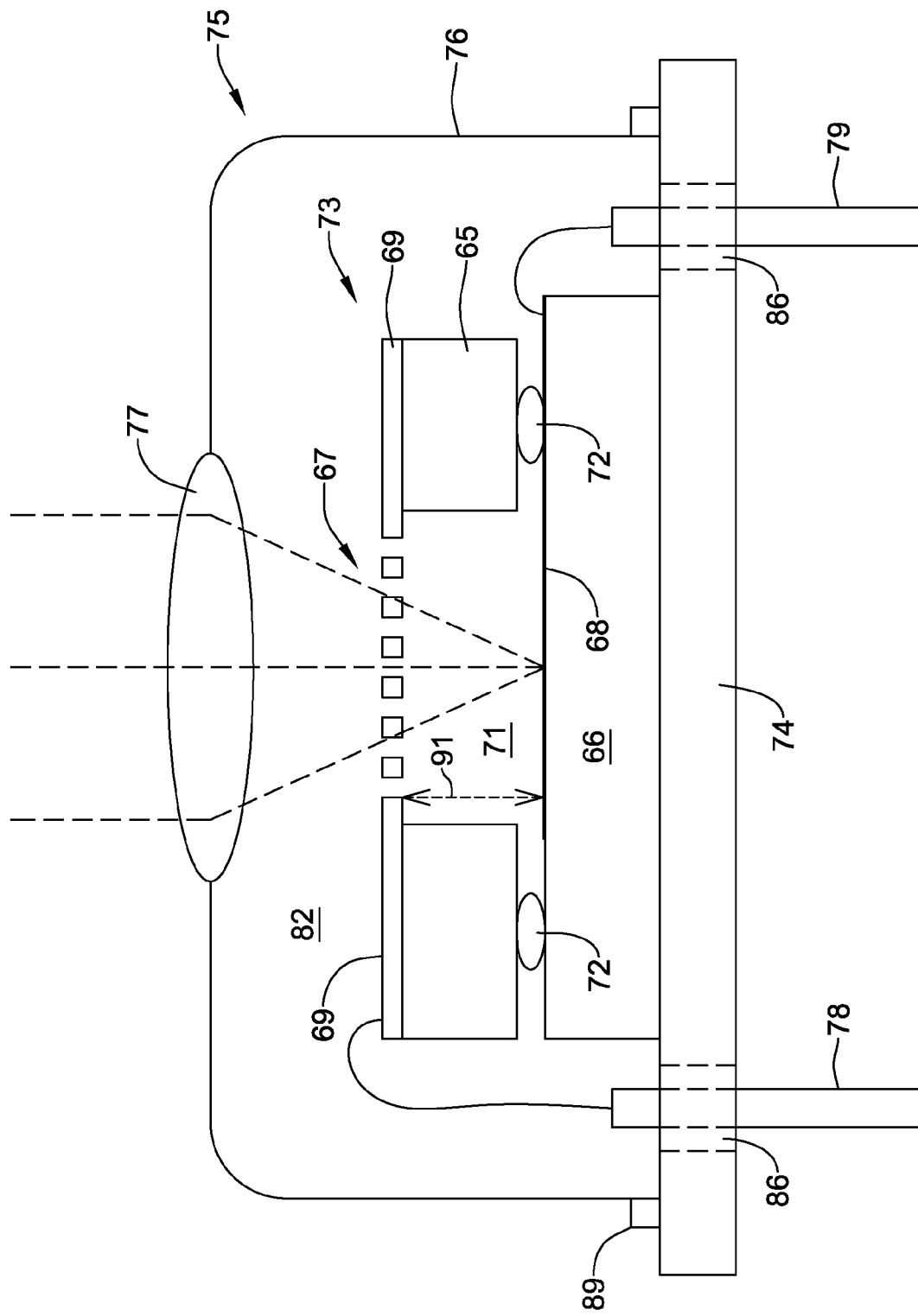
FIGS. 23a, 23b and 23c are cut away views of several MEMS types of sensors.
Figure 23B:
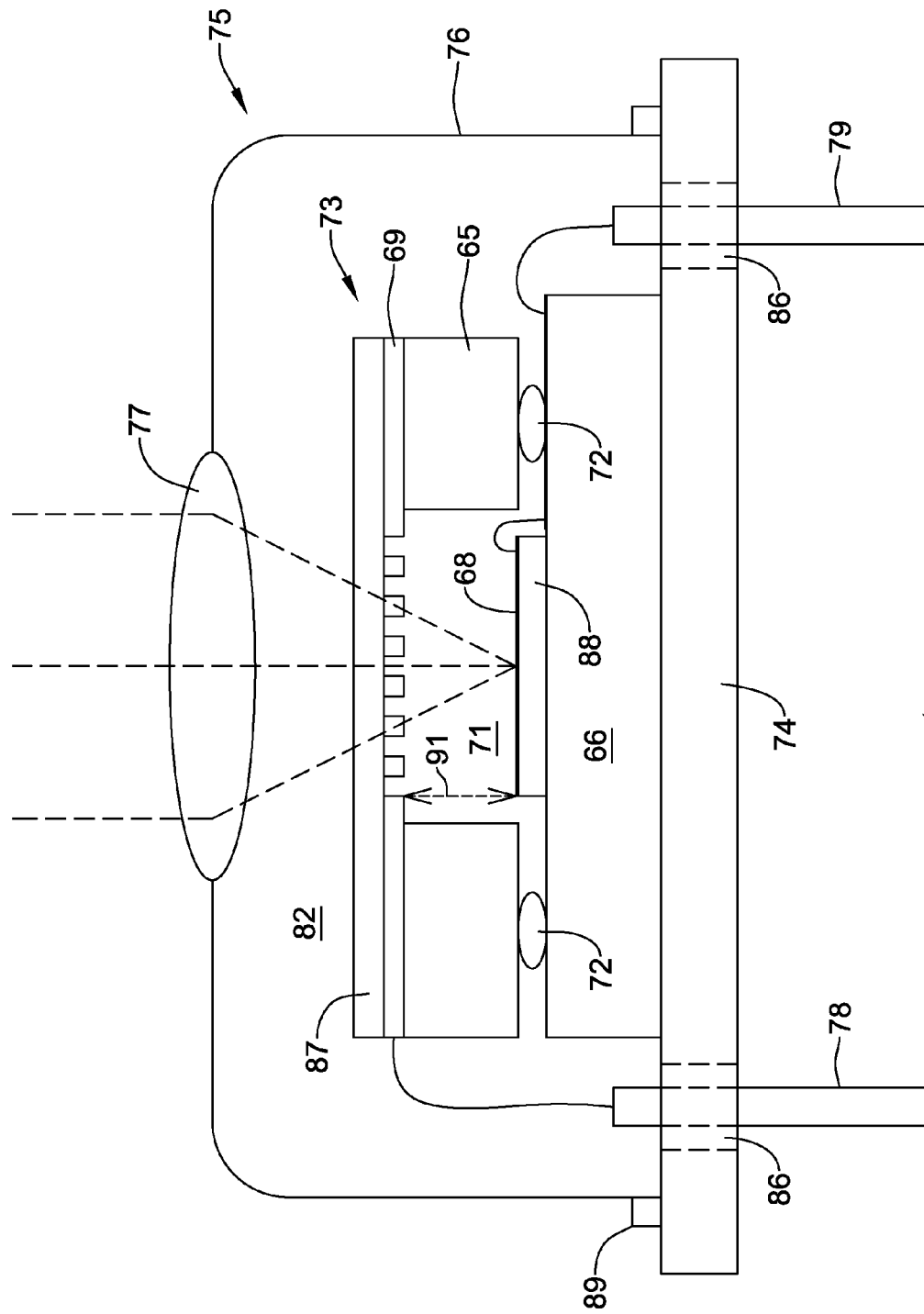
Figure 23C:
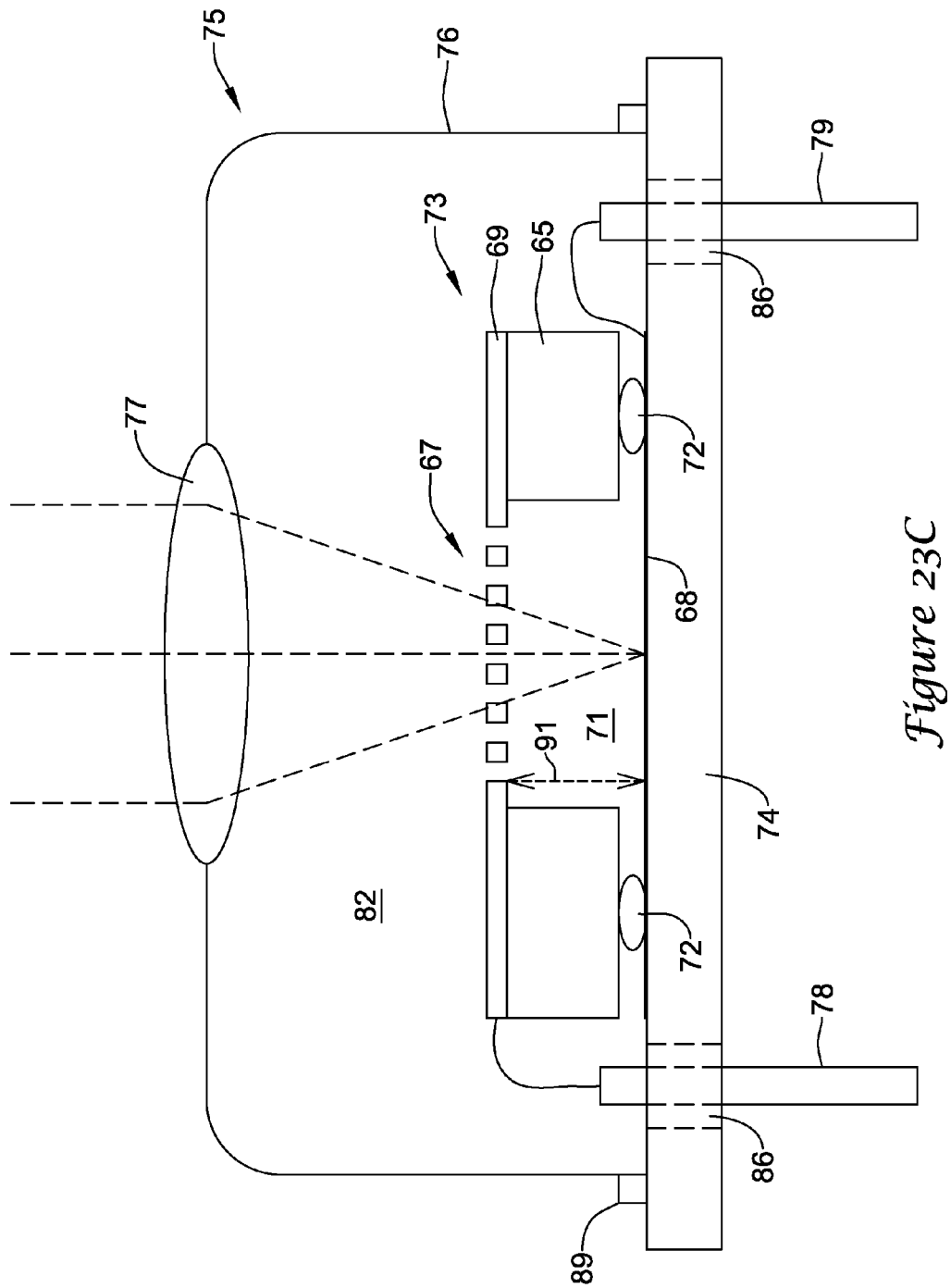
Figure 24:
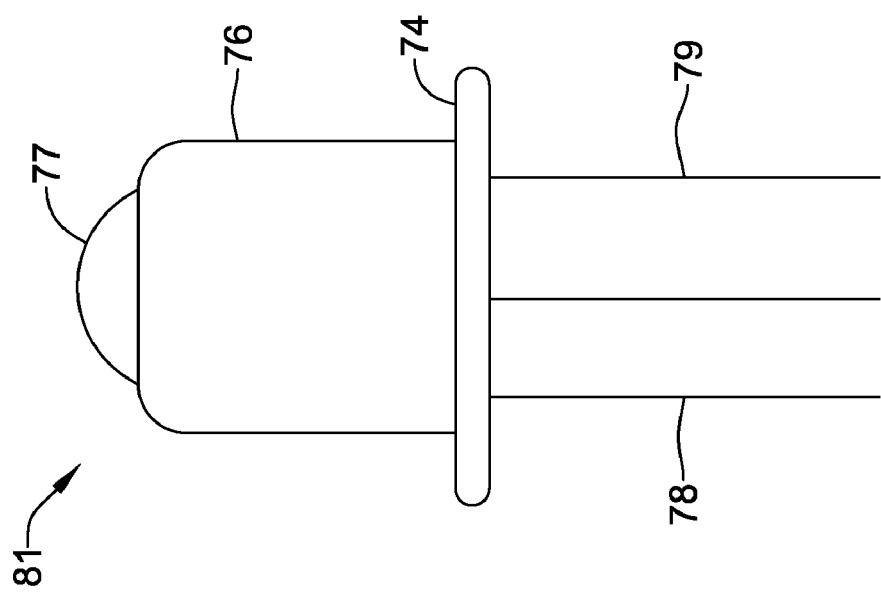
FIG. 24 shows an assembled sensor in a package.

The resulting UV tube MEMS structure 73 may be mounted with a cathode 68 on the floor of, for example, a TO8 or TO5 header 74, within a hermetic package 75 as shown in FIG. 23c. The package 75 may be back-filled with an appropriate gas mixture (e.g., 100 Torr with Ne/H$_2$) in volume 82 and sealed off with either a weld seal (e.g., projection) or a solder seal 89. The pressure may be regarded dependent on the spacing and/or volume of the enclosure and could be between 80 and 120 Torr. The pressure and the cathode-to-anode gap 91 may keep the tube cavity conditions at a Paschen point of the same breakdown or discharge voltage. It may be advisable to have a design that keeps the point within 20 percent of the original Paschen point. The enclosure may involve a projection weld for a seal or an Au:Sn 380 degree seal. The seal 89 may constitute attaching a lid 76 to header 74. The top of the lid may have a hermetic silica UV transmissive lens 77. The lens 77 may be brazed to an enclosure 76. Pin 78 of header 74 may be wire-bonded to anode 69 and pin 79 may be wire-bonded to cathode 68. Pins 78 and 79 may be electrically isolated from header 74 with an insulative material 86, such as for example a ceramic, around the respective pins. The resultant UV sensor may look like sensor 81 of FIG. 24.

The sensor design may provide for a larger gas volume 82 which may mean less impart from Ne or H$_2$ sputter removal. The open anode grid 67 over volume 71 may eliminate coating of the anode 69 UV window. The two wafers 65 and 66 may need to be frit (insulator) attached (not necessarily sealed). Silicon technology may be used for forming holes rather than ultrasonic drilling. The critical components are MEMS. The complexity and cost are lower because of the elimination of a third wafer, dual seals, ultrasonic hole drilling in three wafers, and seal metals. The sensor design is scalable to different sizes. The MEMS part may be separated from the gas reservoir.

FIG. 23b reveals a version of the MEMS sensor that has two sealed volumes 82 and 71. A light transmissive layer 87 may be situated on anode 69 to seal the volume 71 from volume 82. Also, situated on substrate 66 may be a layer 88 which forms a support for cathode 68. The raised nature of cathode 68 on layer 88 and its spacing from an inside wall of the opening in substrate 65 may prevent or minimize a build-up of sputtered material on the wall of volume 71 over time which might eventually short the anode 69 and cathode 68 to each other. Volume 82 may be a buffer or reservoir containing an H$_2$ and Ar (or Xe or Ne) mixture at about 760 Torr (i.e., one atmosphere). The amount of H$_2$ in the mixture may be between 10 and 30 percent. The second sealed volume 82 may have a pressure between about 600 and 900 Torr. Volume 71 may have an H$_2$ and Ne mixture at about 100 Torr. The amount of H$_2$ may be between 10 and 20 percent.

Figure 25:
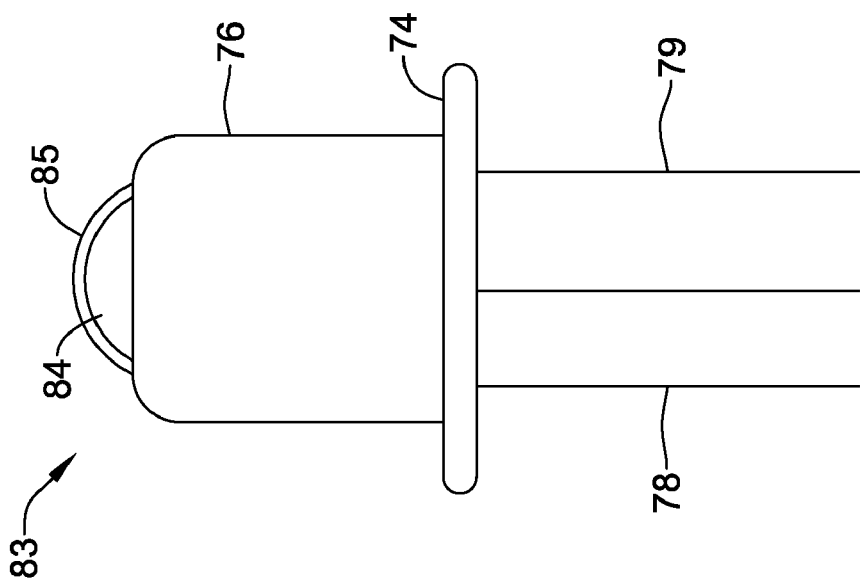
FIG. 25 shows the sensor having a radiation-affecting lens.

FIG. 25 reveals a sensor 83 that is a radiometer version of the UV tube. One may measure UV-C radiation levels as a way to determine the radiation level either for CATOX (catalytic oxidation) like filters or other machines that put out UV radiation. A UV tube's spectral response may be determined by the photocathode. A typical UV tube with a tungsten cathode may be sensitive to light below 280 nanometers (nm). UV-C radiation is radiation emitted below 280 nm. A planar window 84 of the UV light sensor may be coated with a film 85 to provide partial occlusion, absorption or adsorption of UV light and/or other radiation or to provide a tailoring of the frequency versus sensitivity profile of the sensor. This coating or film of the window or lens may be applicable to any of the light sensors disclosed in the present description.

In addition to having a cathode which can detect UV-C radiation, it may be significant that the UV tube having that cathode operates in a proportional (or non-saturated) mode to be a radiometer. If the UV tube is operated at a high frequency (with a voltage below breakdown without UV but above breakdown with UV), under DC UV illumination, a discharge should occur on every pulse every time that the voltage swings high. This may be regarded as a saturation mode. If the UV tube window 84 is coated with and absorbing film 85 to reduce the radiation intensity level such that a pulse does not occur on every cycle but on a proportional number of cycles, then the UV tube sensor may be operated as a radiometer. The number of pulses in a time period may be proportional to the UV-C signal level. The density of the absorber is such to put the tube in the proper radiation range. If the cathode of the sensor 83 emits an electron on every second cycle, then the count rate may be ½ of the maximum. If the signal is two times smaller, then the count rate may drop to ¼ of the maximum. The sensor may be designed (i.e., electrodes, spacing of electrodes, gas mixture, window, optical coating, configuration, and so forth) for various applications such measuring biological effect and so on.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A sensor assembly comprising:
    a cathode;
    a MEMS structure including a silicon substrate and an anode layer extending over at least a portion of the silicon substrate, the silicon substrate further having an opening extending through the silicon substrate below the anode leaving the anode layer suspended across the opening, the MEMS structure situated above the cathode with the anode layer spaced from the cathode;
    a plate, wherein the cathode is positioned between the plate and the MEMS structure;
    an enclosure attached to the plate and hermetically sealing the cathode and the MEMS structure within the enclosure; and
    the enclosure having a light transmissive window proximate to the anode.

2. The assembly of claim 1, further comprising an optical coating formed on the window so that the sensor assembly operates in a non-saturated mode to be a radiometer.

3. The assembly of claim 1, comprising an optical coating formed on the window wherein the coating reduces light transmissive characteristics so that the sensor assembly operates in a proportional mode.

4. The assembly of claim 1, wherein the sensor assembly is a radiometer.

5. The assembly of claim 1, wherein the anode layer includes is a light transmissive conductive material.

6. The assembly of claim 1, wherein the anode layer comprises a plurality of openings.

7. The assembly of claim 1, wherein the sensor assembly is for detecting UV light.

8. A sensor assembly comprising:
    a base;
    a MEMS structure including a first substrate and an anode layer extending over at least a portion of a first side of the first substrate, the first substrate further having an opening extending through the first substrate below the anode leaving the anode layer suspended across the opening, the MEMS structure further having a second substrate bonded to a second side of the first substrate, the second substrate including a cathode layer extending across at least a portion of the second substrate in registration with at least part of the opening in the first substrate;
    the MEMS structure situated adjacent the base;
    a container having an open first end and a second end with a window; and
    wherein the first end of the container is attached to the base resulting in sealing the MEMS structure within the container and base.

9. The assembly of claim 8, further comprising an optical coating formed on the window so that the sensor assembly operates in a non-saturated mode.

10. The assembly of claim 8, further comprising an optical coating formed on the window so that the sensor assembly operates in a proportional mode.

11. The assembly of claim 10, wherein the sensor assembly operates as a radiometer.

12. The sensor of claim 8, wherein the anode layer is UV light transmissive.

13. A sensor assembly comprising:
    a header;
    a first substrate situated on the header;
    a cathode situated on the first substrate;
    a second substrate forming an aperture therethrough situated on the first substrate;
    an anode layer situated on the second substrate and extending across the aperture; and
    a window adjacent the anode; and
    wherein:
    the window is light transmissive;
    the anode is light transmissive;
    the window, the first substrate and the second substrate form a first sealed volume defined by the aperture; and
    the window, the anode layer, the first substrate and the second substrate are bonded together forming a layered MEMS structure.

14. The sensor assembly of claim 13, further comprising:
    an enclosure having an open end situated on the header, wherein the enclosure defines a enclosure window; and
    wherein the enclosure encompasses the window, the anode layer, the first substrate and the second substrate of the MEMS structure.

15. The sensor assembly of claim 14 wherein the enclosure forms a second sealed volume about the MEMS structure.

16. The sensor assembly of claim 15, wherein:
    the first sealed volume comprises $H_2$ and an inert gas; and
    the second sealed volume comprises $H_2$ and an inert gas.

17. The sensor assembly of claim 16, wherein:
    the first sealed volume has a pressure between 80 and 120 Torr; and
    the second sealed volume has a pressure between 600 and 900 Torr.

18. The sensor assembly of claim 17, wherein a distance between the anode and the cathode is between 0.005 and 0.100 inch.

* * * * *